United States Patent [19]  
Watanabe et al.

[11] Patent Number: 4,616,236  
[45] Date of Patent: Oct. 7, 1986

[54] IMAGE FORMING APPARATUS WITH COLOR TRANSFER MATERIAL

[75] Inventors: Junji Watanabe; Eiichi Yamanishi, both of Yokohama, Japan

[73] Assignee: Kabushiki Kaisha Toshiba, Kawasaki, Japan

[21] Appl. No.: 629,492

[22] Filed: Jul. 10, 1984

[30] Foreign Application Priority Data

Jul. 15, 1983 [JP] Japan .................................. 58-128923

[51] Int. Cl.⁴ ........................ G01D 10/15; H04N 1/22
[52] U.S. Cl. ................. 346/76 PH; 346/105; 400/240.3; 400/240.4; 400/207
[58] Field of Search ............... 346/76 R, 76 PH, 106, 346/136, 46; 400/120, 240.3, 240.4, 201, 207, 208; 101/DIG. 3, 332, 202; 219/216 PH; 358/287, 296

[56] References Cited  
U.S. PATENT DOCUMENTS 4,532,525 7/1985 Takahashi ...................... 346/76 PH

FOREIGN PATENT DOCUMENTS 60-026496 1/1985 Fed. Rep. of Germany ... 400/240.3  
57-8186A  1/1982 Japan .............................. 346/76 PH Primary Examiner—Arthur G. Evans  
Attorney, Agent, or Firm—Cushman, Darby & Cushman

[57] ABSTRACT

An image forming apparatus for applying a multicolor image to a sheet with transfer material including successive sections of coloring agents of different colors. When the size of the sheet or the region on the sheet in which the image is to be formed is less than half the size of each section of coloring agent, only a portion of each of the sections is used to form a first image. A different portion of each of the sections is then used to form a second image on a second sheet, thus conserving the transfer material. The coloring agent may be heat-fusible ink and may be transferred by means of a thermal head.

21 Claims, 37 Drawing Figures

IMAGE FORMING APPARATUS WITH COLOR TRANSFER MATERIAL

BACKGROUND OF THE INVENTION

The present invention relates to image forming devices capable of multicolor image forming. More specifically, the present invention relates to thermal transfer type image forming devices employing a multicolor transfer material coated with coloring agents of different colors which thermally transfer the coloring agents on the transfer material to an object in succession, thereby forming a multicolor image on the object.

Conventionally, thermal transfer type image forming devices are small sized, low-priced, noisefree, and capable of image formation on ordinary paper. Therefore, this type of image forming devices has recently started to be practically used for electronic copiers, as well as for recording the output of computers, word processors, etc.

Some of these devices can form multicolor images by the use of a multicolor transfer material coated with coloring agents of different colors defining divisions of the same fixed area. One such conventional image forming device of this type uses a transfer material which is coated with yellow (Ye), magenta (Ma), cyan (Cy) and black (Bl) coloring agents successively arranged at regular intervals 1, as shown in FIG. 1. In this transfer material, there are blanks or uncoated regions between the coloring agents and along both side edges of the material. In FIG. 1, the width of the border blanks is indicated by W1 (W1=0 is possible), while those of the marginal blanks are indicated by W2 and W3 (W2=W3 or W2=W3=0 is possible). Thus, color agent regions a (Ye), b (Ma), c (Cy) and d (Bl) with length x and width y are formed on the transfer material with those blanks between and around them. The transfer material also has nontransferable margins of widths W4, W5, W6 and W7 which are left around the coloring agent regions a, b, c and d, defining transfer regions a', b', c' and d' (hatched portions in FIG. 1) of length X0 and width Y0 which are actually used in the conventional image forming operation. In the transfer process, the object is centered in each of the actual transfer regions.

In one case, it may be required to form an image on an object of e.g. size A5 (half as wide as size A4) by using a transfer material of e.g. size A4. In another case, an instruction may be given to form an image which corresponds to a transfer region even smaller than size A5 by the use of the transfer material of size A4. In these cases, only the central portion (cross-hatched portion in FIG. 1) of each transfer region is used for the transfer, and those regions left untransferred cannot be reused. Thus, the prior art image forming apparatus is not very economical.

SUMMARY OF THE INVENTION

The present invention is contrived in consideration of these circumstances, and is intended to provide an image forming apparatus in which a transfer material can be effectively used without loss in a transfer process using a transfer region having a length shorter than half the length of each coloring agent region of the transfer material along the traveling direction thereof.

In order to attain the above object, an image forming apparatus according to the present invention is provided with repeated use detecting means for detecting repeated transfers in a transfer region shorter than half the length of each coloring agent region of a transfer material along the traveling direction thereof, and transfer material conveying means for conveying the transfer material in accordance with a detection signal from the detecting means so that each coloring agent region is used twice, by halves, along the course of the transfer material. The remaining half of the transfer region which has not been used in a first transfer process is used in a second transfer process. Thus, the transfer material may be presented from being wasted.

BRIEF DESCRIPTION OF THE DRAWINGS

These and other objects and advantages of this invention will become apparent and more readily appreciated from the following detailed description of the presently preferred exemplary embodiments in conjunction with the accompanying drawings, of which:

FIGS. 2 to 20 show one embodiment of the image forming apparatus according to the present invention, in which:

FIG. 2 is a perspective view schematically showing an outline of the image forming apparatus, FIG. 3 is a broken away, perspective view schematically showing the apparatus of FIG. 2, FIG. 4 is a vertical side sectional view schematically showing the interior of the apparatus, FIG. 5 is a perspective view for illustrating the transfer operation, FIG. 8 is a block diagram showing a control system of the apparatus, FIG. 9 is a sectional view showing a ribbon cassette, FIG. 10 is a perspective view schematically showing a ribbon driving mechanism, FIGS. 11 and 12 are perspective views schematically showing the ribbon cassette, FIGS. 13 and 14 are perspective views showing the way the ribbon cassette is loaded, FIG. 15 is a broken away, perspective view showing the apparatus from which the ribbon cassette and a sheet cassette are removed, FIG. 16 is a perspective view schematically showing sheet cassette type detecting means, FIG. 17 is a perspective view schematically showing sheet cassette type detecting means, FIG. 18 is a block diagram for illustrating a repeated operation mode, and FIGS. 19 and 20 are plan views showing the way each coloring agent region of the thermal transfer ribbon is used by halves; and FIGS. 21 to 26 show various modifications of the invention, in which:

FIG. 21 is a perspective view showing a modification of the ribbon cassette which is provided with removable projections as indicators for information detection, FIG. 22 is a sectional view showing how each of the projections of FIG. 21 is set in position, FIG. 23 is a perspective view showing a modification of the sheet cassette which is provided with removable projections as indicators for information detection, FIG. 24 is a sectional view showing how each of the projections of FIG. 23 is set in position, FIGS. 25 and 26 are vertical side sectional views schematically showing alternative embodiments of the image forming apparatus according to the invention.

DETAILED DESCRIPTION OF THE PRESENTLY PREFERRED EMBODIMENTS

One embodiment of a thermal transfer type image forming apparatus according to the present invention will now be described in detail with reference to FIGS. 2 to 20.

Figure 1:
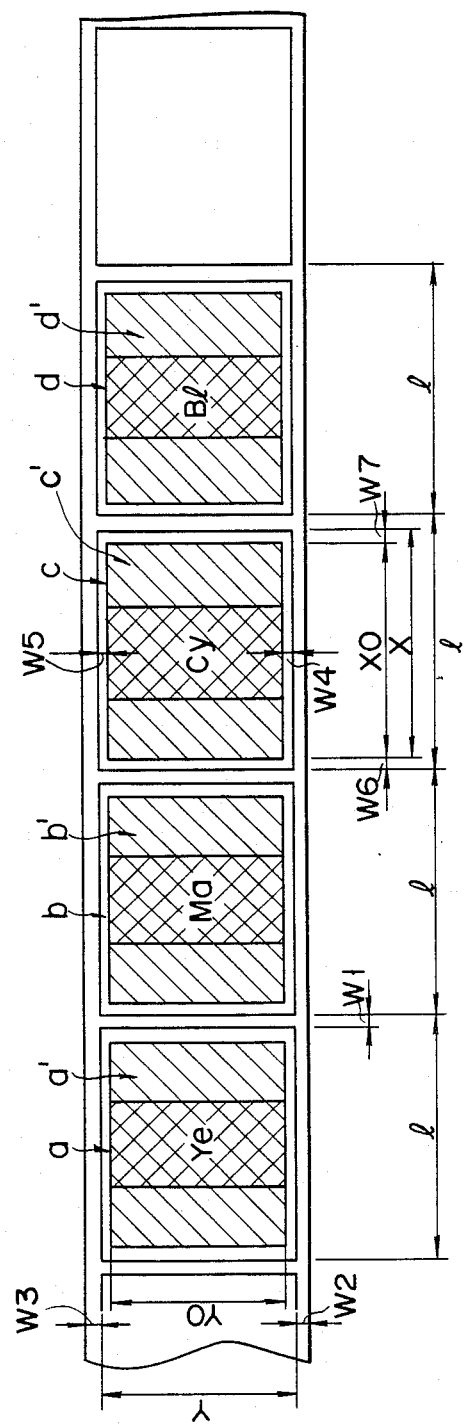
FIG. 1 is a plan view showing the relationships between coloring agent regions and transfer regions of a thermal transfer ribbon as a transfer material used in a prior art image forming apparatus.
Figure 2:
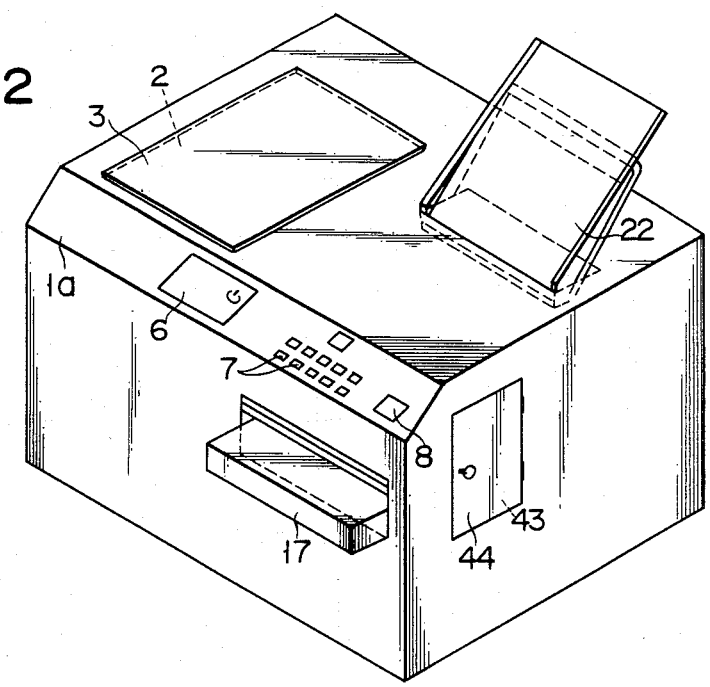
Figure 3:
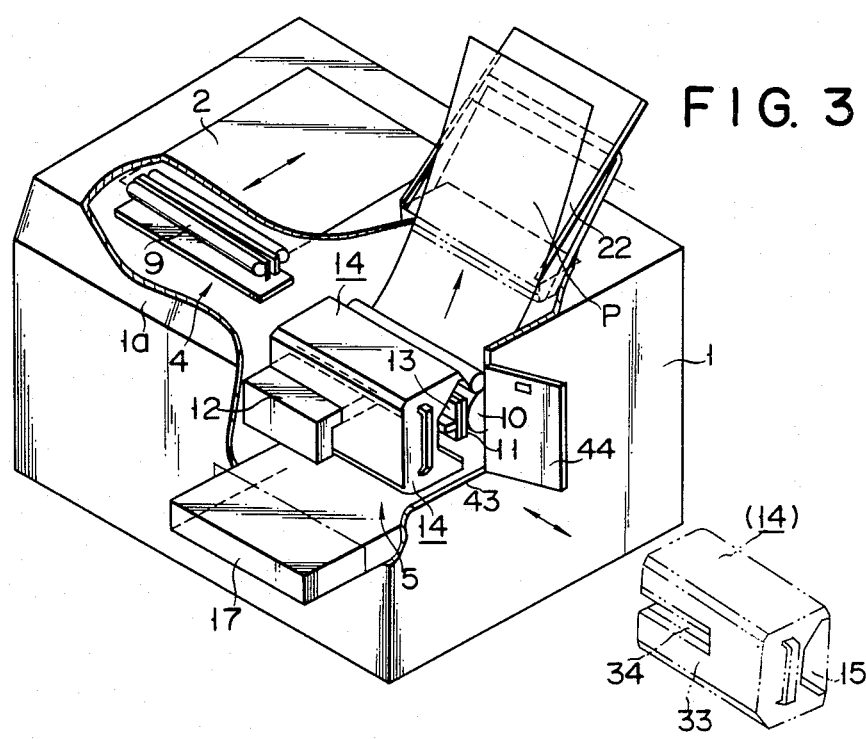

FIG. 2 shows an outline of an image forming apparatus using a thermal transfer material cassette according to the one embodiment. In FIG. 2, an operator control panel section 1a is formed at the upper front portion of a housing 1. As shown in FIG. 3, an original scanning unit 4 for scanning an original paper 3 set on an original table 2 and an image forming section 5 are arranged on the left and right sides, respectively, in housing 1.

Operator control section 1a is provided with a display unit 6, a keyboard 7, and a key button 8. Original scanning unit 4 optically scans original paper 3 on original table 2 as a moving scanning portion 9 of an optical exposure system reciprocates along the under surface of original table 2, as shown in FIG. 3. Optical information obtained by this optical scanning is photoelectrically converted into an image signal, which is inputted to image forming section 5.

Figure 4:
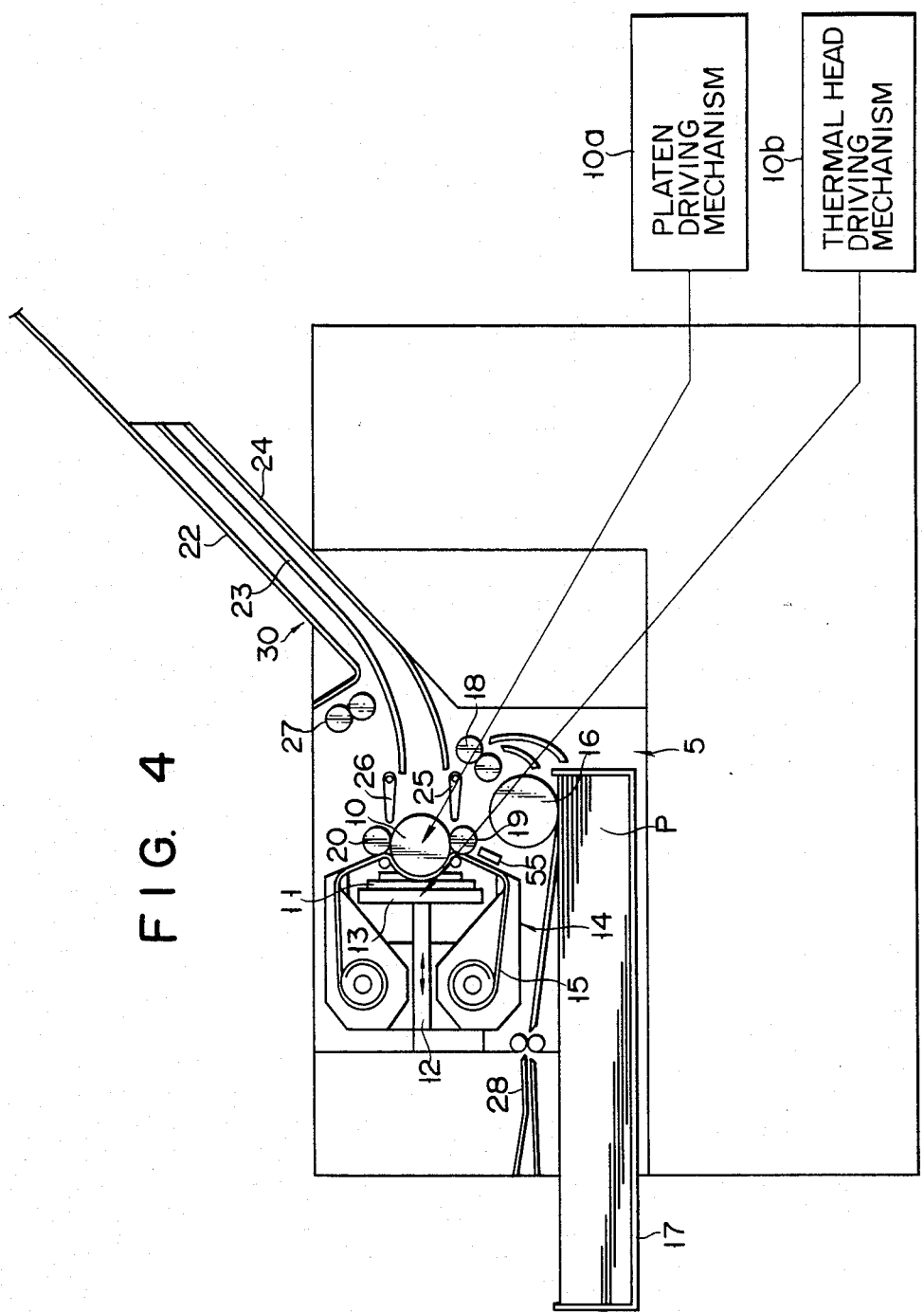

As shown in FIGS. 3 and 4, image forming section 5 includes a platen 10 located substantially in the central portion thereof. A thermal head 11 as a recording head is disposed in front (on the left in FIG. 4) of platen 10. Platen 10 is rotated clockwise or counterclockwise by a platen driving mechanism 10a including a reversible motor (not shown). Thermal head 11 can be brought into contact with or removed from platen 10 by a thermal head driving mechanism 10b. When thermal head 11 is pressed against platen 10 by thermal head driving mechanism 10b, a thermal transfer ribbon 15 (mentioned later) and a sheet P are clamped between platen 10 and thermal head 11. When thermal head 11 is separated from platen 10, thermal transfer ribbon 15 and sheet P are allowed to travel freely.

Thermal head 11 is mounted on a heat radiating board 13 which is formed integrally on the rear end face of a holder 12 attached to housing 1. Holder 12 holds a first thermal transfer ribbon cassette 14 (hereinafter referred to simply as ribbon cassette) as a thermal transfer material cassette. In this state, thermal transfer ribbon 15 as a thermal transfer material is interposed between thermal head 11 and platen 10.

A sheet cassette 17 containing sheets P of size A4 (210 mm×297 mm) or A5 (148 mm×210 mm) is removably attached to that portion of housing 1 which is located below platen 10. A sheet supply roller 16 lies below platen 10 off to the right (in FIG. 4). Sheets P as objects of transfer are taken out one by one from sheet cassette 17 as sheet supply roller 16 rotates. The forward end of each of sheets P taken out in this manner is aligned by a pair of aligning rollers 18 which are arranged above sheet roller 16 off to the right (in FIG. 4). After this alignment, sheet P is moved toward platen 10 as aligning rollers 18 rotate. Sheets P pass around the outer peripheral surface of platen 10 with the aid of a pair of backup rollers 19 and 20, and are thus fed in an accurate manner.

Figure 5:
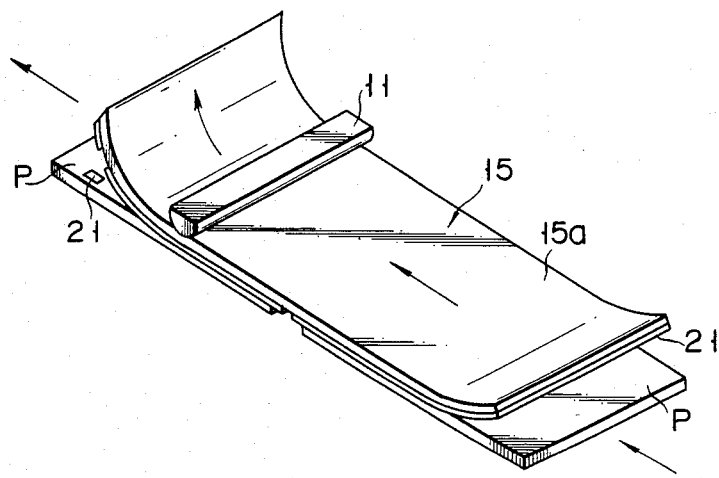

Meanwhile, thermal head 11 presses thermal transfer ribbon 15 against platen 10 through the medium of sheet P. As shown in FIG. 5, ink 21 as a coloring agent on thermal transfer ribbon 15 is melted by heat and is transferred to the surface of sheet P as thermal head 11 is driven in accordance with an image signal.

Figure 6A:
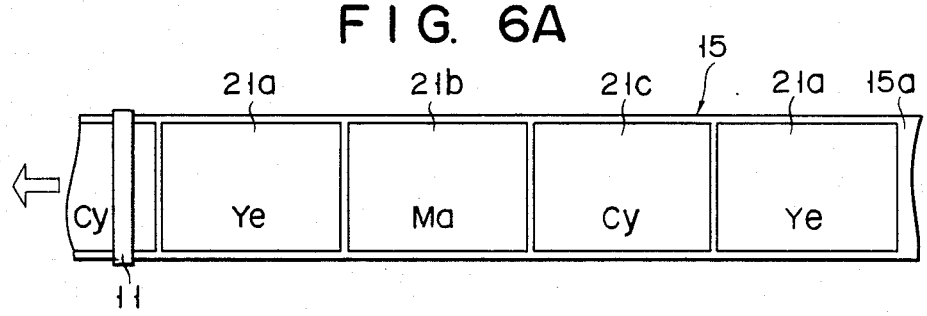
FIG. 6A is a plan view showing an inkcoated thermal transfer ribbon.

Thermal transfer ribbon 15 has a film 15a as a base. As shown in FIG. 6A, yellow (Ye), magenta (Ma), cyan (Cy) inks are applied to film 15a, forming repetitive series of ink portions 21a, 21b and 21c, respectively. Each of ink portions 21a, 21b and 21c is substantially as wide as sheet P of size A4. As shown as a modification in FIG. 6B, black (Bl) ink may be additionally applied to film 15a to form another ink portion 21d which follows ink portion 21c.

Figure 6B:
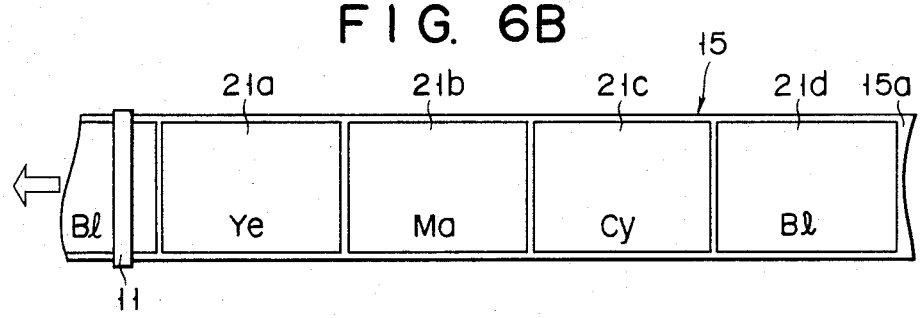
FIG. 6B is a plan view showing a modification of the thermal transfer ribbon.

The modified version of the thermal transfer ribbon shown in FIG. 6B, which includes the additional black ink portion 21d, is used expressly when a deep or clear black color is required. Thermal transfer ribbon 15 of FIG. 6A, without the black ink portion 21d can produce a substantially black color through superposition of all its three colors.

Thus, sheet P is reciprocated at a frequency corresponding to the number of colors used as the platen 10 rotates. During this reciprocation, sheet P is carried onto first and second guides 23 and 24 which are arranged in layers under a tray 22.

First guide 23 has its starting end near the position where platen 10 and upper backup roller 20 are in rolling contact, and extends along the under surface of tray 22. Located under first guide 23, second guide 24 has its starting end near the position where platen 10 and lower backup roller 19 are in rolling contact, and extends along first guide 23. A first distribution gate 25 is provided between the starting end portion of second guide 24 and the rolling contact point between platen 10 and lower backup roller 19. First distribution gate 25 can move between a first position where it leads sheet P from aligning rollers 18 to the interface between platen 10 and lower backup roller 19 and a second position where gate 25 leads sheet P from the interface into the space between first and second guides 23 and 24. Likewise, a second distribution gate 26 is provided between the starting end of first guide 23 and the contact between platen 10 and upper backup roller 20. Second distribution gate 26 can move between a first position where it feeds sheet P from the interface between platen 10 and upper backup roller 20 into the space between tray 22 and first guide 23, and a second position where gate 26 leads sheet P onto tray 22. First and second distribution gates 25 and 26 are driven by a rotary solenoid (not shown).

Figure 7A:
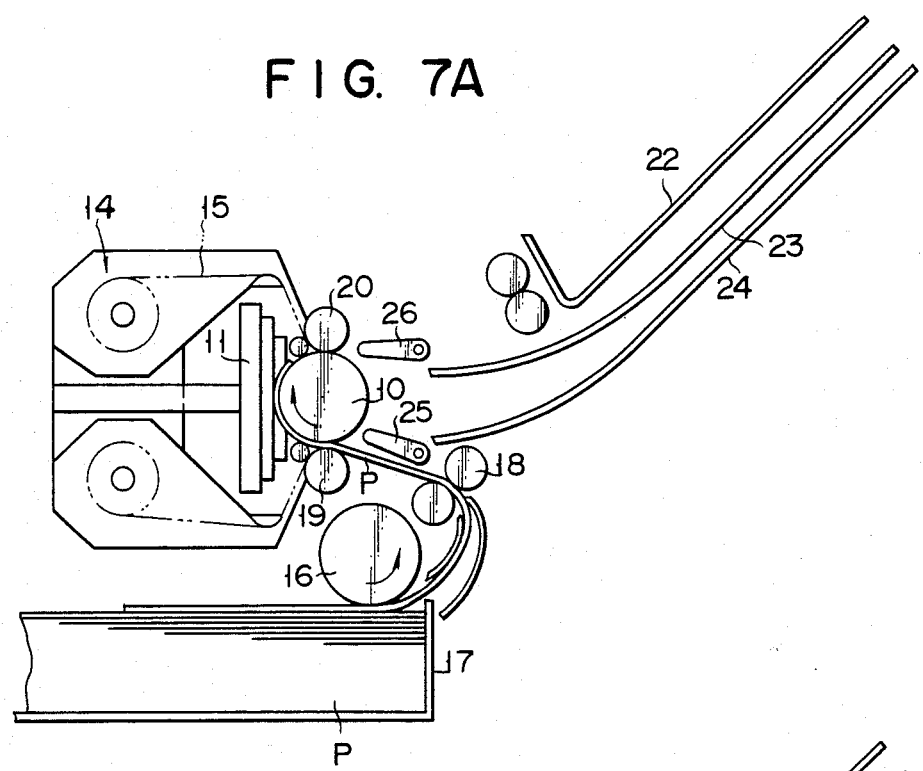
FIGS. 7A to 7D are side views for illustrating the movement of a sheet during a multicolor transfer process.

Referring now to FIGS. 7A to 7D, the transfer operation will be described. First, A4 size sheet P, fed from sheet cassette 17 by rotating sheet supply roller 16, is wound around platen 10, as shown in FIG. 7A, after passing between aligning rollers 18 and by first distribution gate 25. The forward end of sheet P is positioned so that the printing start position of sheet P faces thermal head 11. In this state, sheet P and yellow (Ye) ink portion 21a of thermal transfer ribbon 15 overlap each other.

Figure 7B:
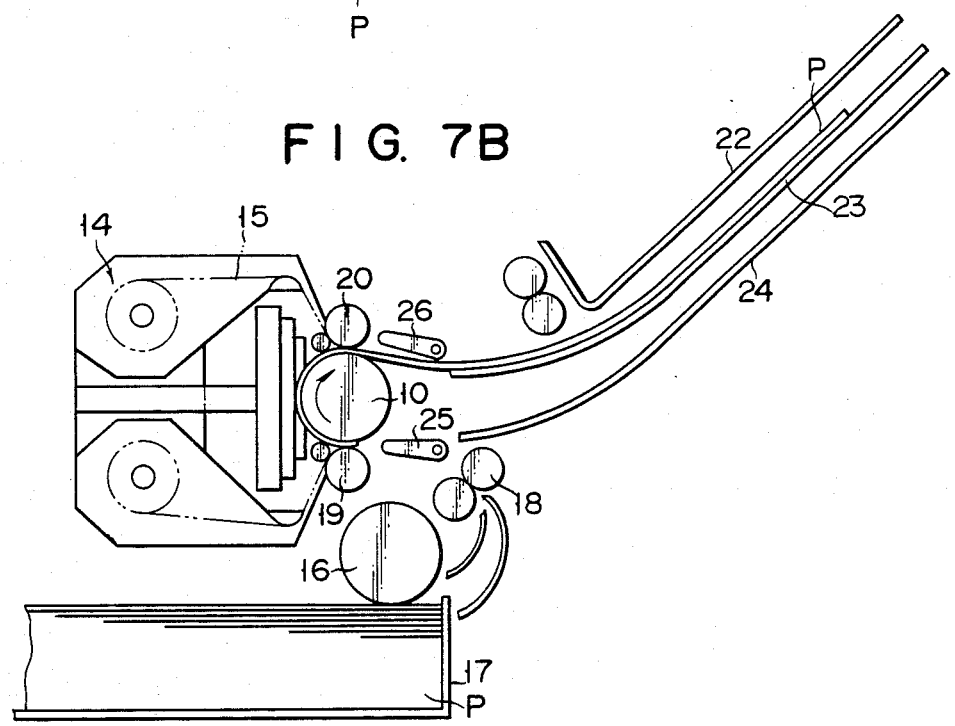

Then, platen 10 is rotated clockwise by platen driving mechanism 10a to feed sheet P at a predetermined speed. Meanwhile, thermal transfer ribbon 15 is also fed at the same feeding speed for sheet P by a ribbon driving mechanism 34 (mentioned later). Thereafter, heat generating elements (not shown) of thermal head 11, arranged in line-dot configuration along the axial direction of platen 10, generate heat in accordance with image information which corresponds to yellow image portions so that the yellow ink on ink portion 21a of thermal transfer ribbon 15 is transferred to sheet P. The forward end portion of sheet P, having passed between platen 10 and thermal head 11, is delivered onto first guide 23 under tray 22, guided by second distribution gate 26 in its first position, as shown in FIG. 7B.

Figure 7C:
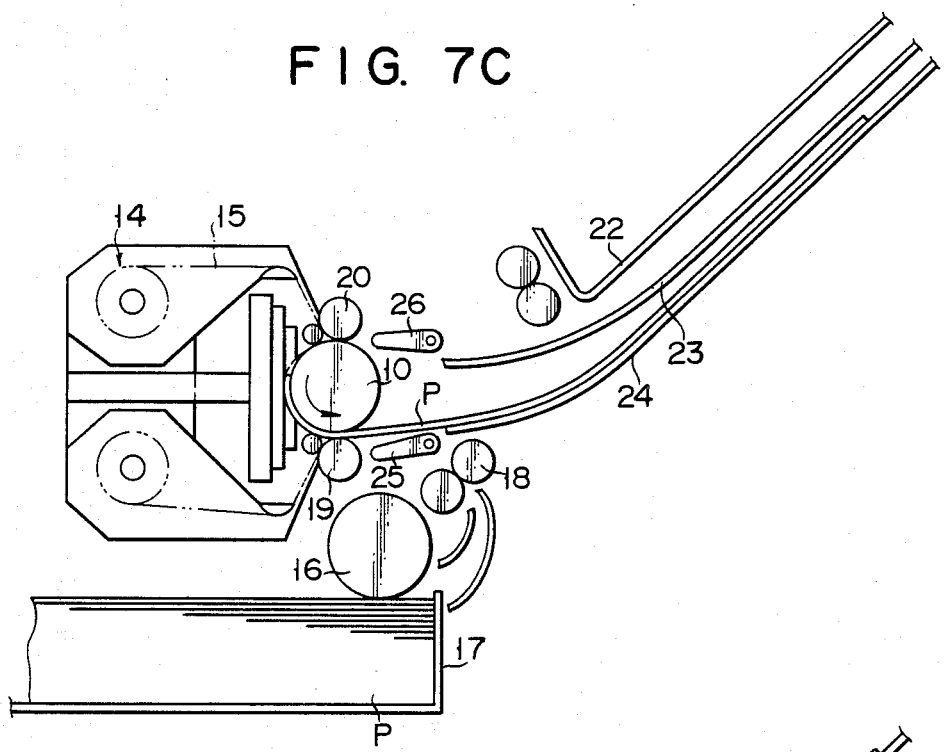

After the yellow image portions are transferred to sheet P in this manner, platen 10 ceases to rotate, to stop the feed of sheet P so that the rear end of sheet P is held between platen 10 and thermal head 11. Thereafter, thermal head 11 is separated from platen 10 by thermal head driving mechanism 10b. Also, first distribution gate 25 is shifted from the first position to the second position thereof. Separated from thermal head 11, platen 10 is rotated counterclockwise by platen driving mechanism 10a, causing sheet P to return to the transfer start position while resting on second guide 24, as shown in FIG. 7C. Meanwhile, thermal transfer ribbon 15 is further fed by ribbon driving mechanism 34, and magenta ink portion 21b is brought into registration with platen 10.

Thereafter, an image corresponding to magenta ink portion 21b is transferred to sheet P to which the yellow image portion has previously been transferred. Cyan and black image portions are transferred in the same manner.

Figure 7D:
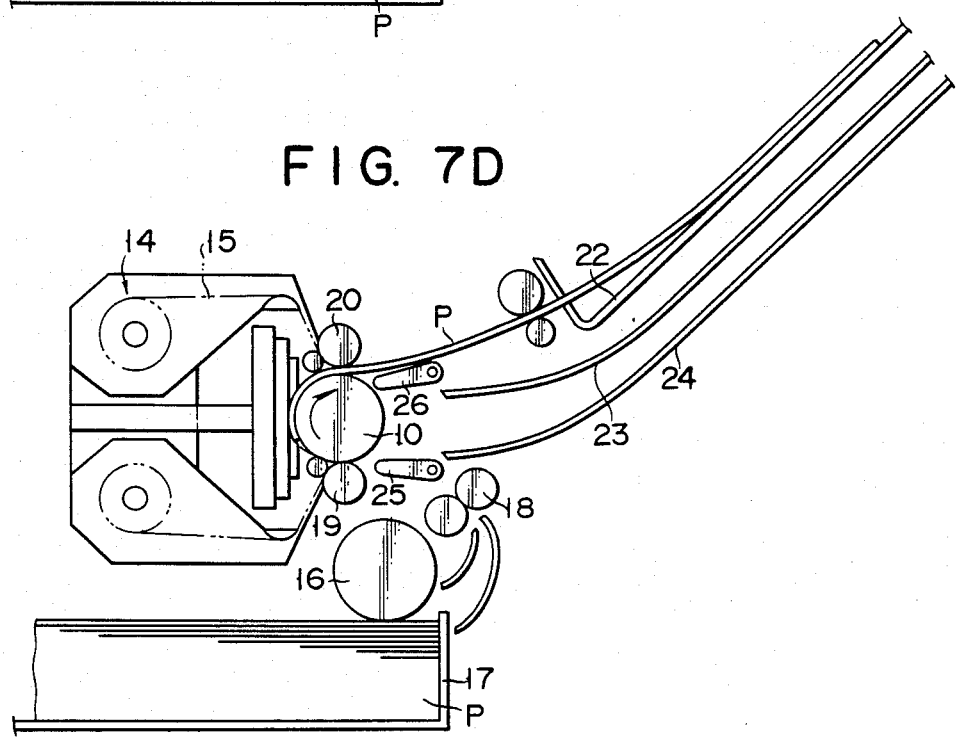

Finally, sheet P having undergone the entire transfer process is guided to a pair of exit rollers 27 by second distribution gate 26 in the second position, and is then discharged into tray 22, as shown in FIG. 7D. Exit rollers 27, tray 22, and first and second guides 23 and 24 are formed as one unit. This unit can be removed as required.

Figure 8:
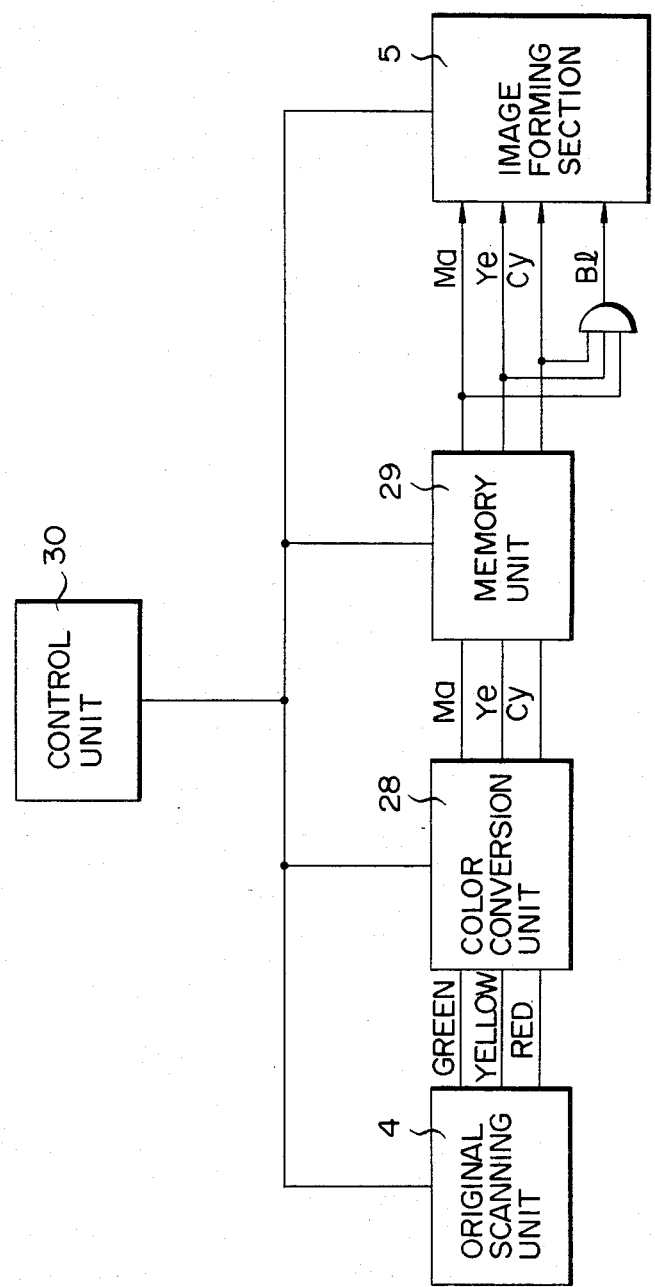

As shown in FIG. 8, the image forming apparatus has a conventional arrangement, comprising original scanning unit 4, a color conversion unit 28, a memory unit 29, image forming section 5, and a control unit 30.

Numerical values for green, yellow and red color components, detected by scanning unit 4, are converted into the colors of the printing media, magenta (Ma), yellow (Ye) and cyan (Cy), by color conversion unit 28. The converted values, along with information concerning their position on the original, are stored in memory unit 29 for each color. In image forming section 5, printing media of magenta (Ma), yellow (Ye), cyan (Cy) and black (Bl) (logical AND combination of Ma, Ye and Cy) are transferred to the sheet P in accordance with the values read out from memory unit 29. Control unit 30 controls all the operations of scanning unit 4, color conversion unit 28, memory unit 29, and image forming section 5.

Figure 9:
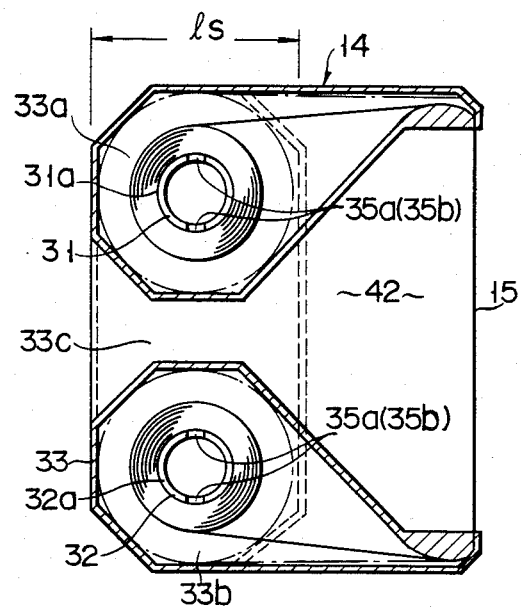

As illustrated in FIG. 9, ribbon cassette 14 is provided with two parallel roll shafts 31 and 32 acting as take up and supply reels for thermal transfer ribbon 15. Case 33 encloses thermal transfer ribbon 15 and roll shafts 31 and 32 so that the middle portion of thermal transfer ribbon 15 is partially exposed so that platen 10 and thermal head 11 may lie on opposite sides of ribbon 15.

A gap 33c (see FIGS. 9 and 11) is formed between rolling shaft holding portions 33a and 33b containing roll shafts 31 and 32, respectively, extending a partial distance along the axial direction of roll shafts 31 and 32. Driving force receiving end portions 31a and 32a of the roll shafts 31 and 32 are arranged on the open end side of the slit 33c.

Figure 10:
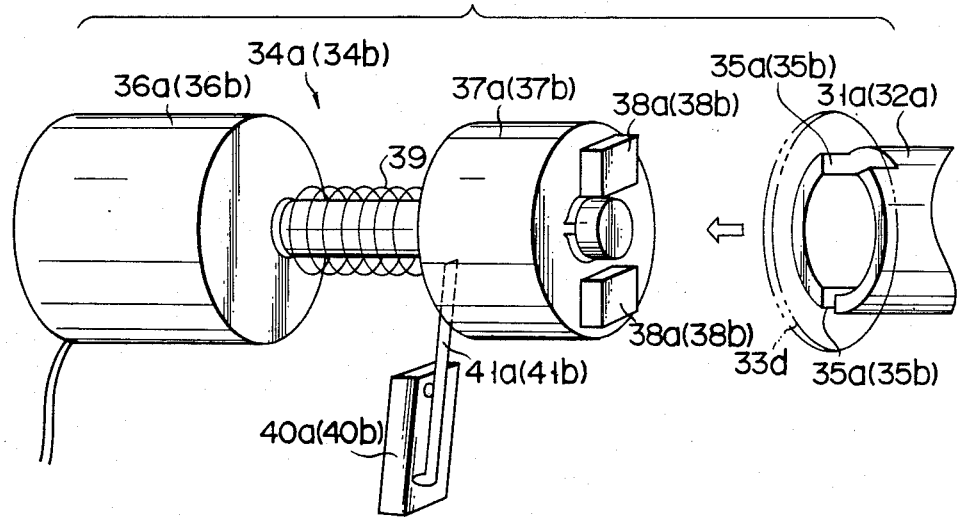
Figure 11:
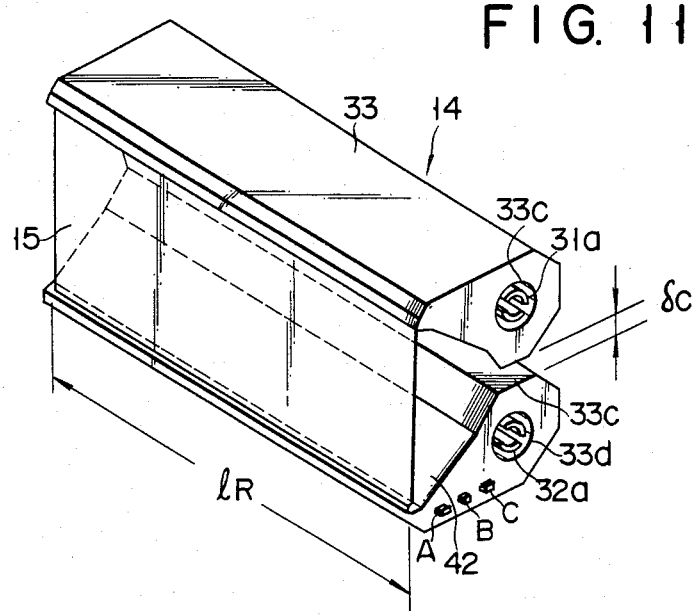

The respective driving force receiving end portions 31a and 32a of roll shafts 31 and 32 individually face through holes 33d formed in the end face of case 33, as shown in FIGS. 10 and 11. Each of driving force receiving end portions 31a and 32a is composed of a pair of notches 35a and 35b formed in the end portion of its corresponding roll shaft 31 or 32. Image forming section 5 is provided with ribbon driving mechanism 34. Ribbon driving mechanism 34 comprises first and second driving mechanisms 34a and 34b for winding and rewinding ribbon 15, respectively. First and second driving mechanisms 34a and 34b, include a pair of couplings 37a and 37b, respectively, which engage driving force receiving end portions 31a and 32a, respectively, such that ribbon cassette 14 is set in position in image forming section 5. Couplings 37a and 37b engage driving force receiving end portions 31a and 32a, respectively, as a pair of engaging projections 38a and 38b, attached to each of the couplings 37a and 37b, engage notches 35a and 35b, respectively. Couplings 37a and 37b are attached, respectively, to the drive shafts of a pair of motors 36a and 36b as drive sources of ribbon driving mechanism 34 which is arranged in image forming section 5. When couplings 37a and 37b attached to the motors 36a and 36b engage driving force receiving end portions 31a and 32a of roll shafts 31 and 32, respectively, the driving forces of the motors 36a and 36b are transmitted to their corresponding roll shafts 31 and 32 to rotate the same. Couplings 37a and 37b can move along the extending directions of the drive shafts of motors 36a and 36b, and are each urged axially outward by a spring 39. At the time of ribbon cassette loading, therefore, even if engaging projection 38a or 38b of coupling 37a or 37b abuts against the end face of driving force receiving end portion 31a or 32a without engaging notch 35a or 35b of roll shaft 31 or 32, coupling 37a or 37b moves inward against the urging force of the spring 39 so ribbon cassette 14 is loaded. Thus, couplings 37a and 37b are kept from hindering the ribbon cassette loading operation.

Control switches 40a and 40b are disposed near couplings 37a and 37b, respectively. Control switches 40a and 40b detect the shift of couplings 37a and 37b, and control the drive of motors 36a and 36b, respectively. When coupling 37a or 37b moves axially inward, a lever 41a or 41b of switch 40a or 40b is passed to turn on the same, thereby starting motor 36a or 36b. As motor 36a or 36b rotates, engaging projection 38a or 38b of coupling 37a or 37b faces notch 35a or 35b of roll shaft 31 or 32. Thereupon, coupling 37a or 37b engages its corresponding roll shaft 31 or 32, urged by spring 39. At the same time, coupling 37a or 37b returns or moves axially outward to turn off switch 40a or 40b, thereby stopping motor 36a or 36b.

When switch 40a or 40b is off, a narrow gap is defined between the opposite faces of coupling 37a or 37b and lever 41a or 41b of switch 40a or 40b. Thus, in the normal operation, lever 41a or 41b of switch 40a or 40b will never prevent the rotation of motor 36a or 36b.

Figure 12:
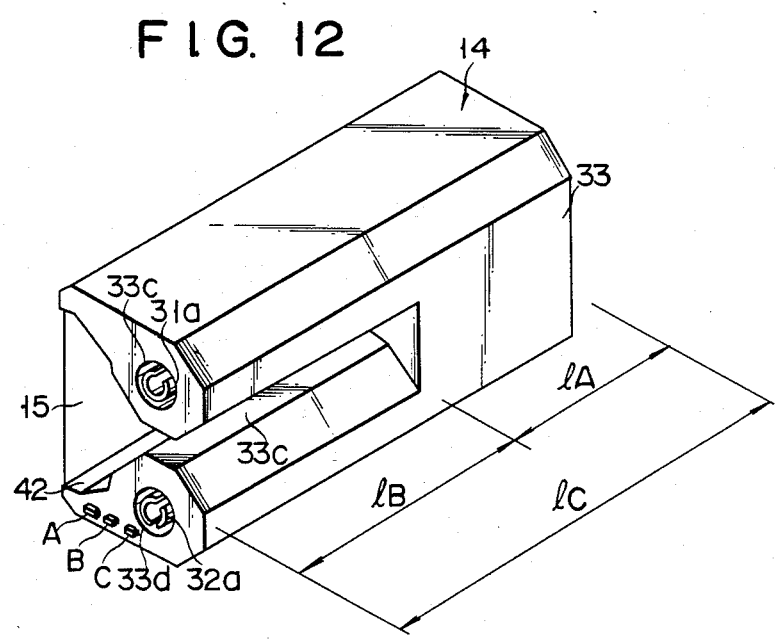

As shown in FIGS. 9, 11 and 12, case 33 of ribbon cassette 14 has a space portion 42 inside the exposed portion of thermal transfer ribbon 15. Space portion 42 is sufficiently large to receive heat radiating board 13 integrally formed on the rear end face of holder 12 and thermal head 11 attached to radiating board 13. Thus, a portion of case 33 has a substantially C-shaped cross section.

Since each of ink portions 21a to 21d of thermal transfer ribbon 15 is of size A4, width $l_R$ (see FIG. 11) of thermal transfer ribbon 15 is greater than maximum roll diameter $l_S$ (see FIG. 9) of ribbon 15 wound on roll shaft 31 or 32. Cut depth $l_B$ (see FIG. 12) of slit 33c in case 33 is greater than half width $l_R$ of thermal transfer ribbon 15 ($l_B > \frac{1}{2} l_R$).

As shown in FIG. 12, ribbon cassette 14 is composed of a solid portion along length $l_A$ and a split portion along length $l_B$. Width $\delta_C$ (see FIG. 11) of slit 33c is a little greater than thickness $\delta_H$ (see FIG. 13) of holder 12. Cut depth $l_B$ of slit 33c is substantially equal to width $l_H$ (see FIG. 14) of holder 12.

Figure 13:
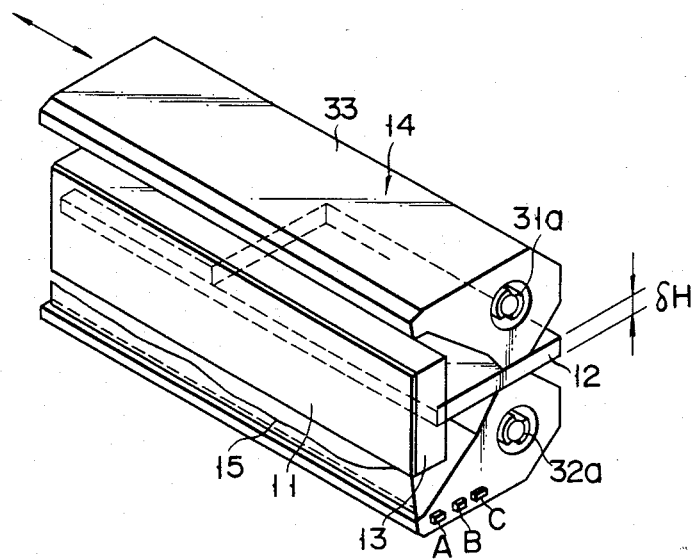
Figure 14:
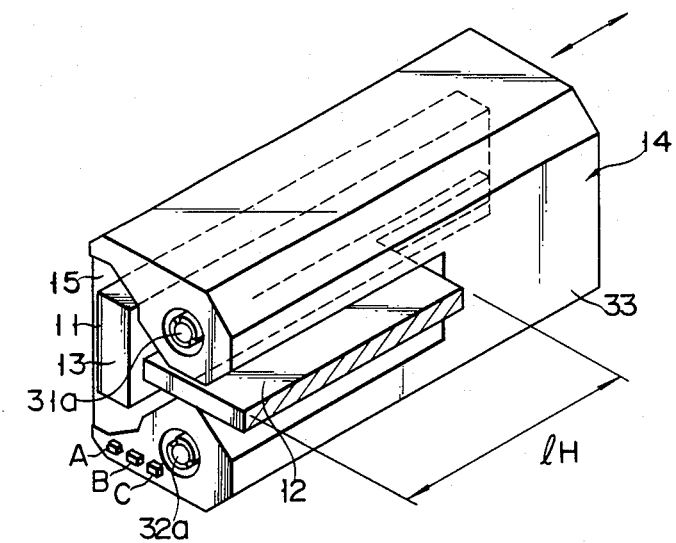

Thus, in setting ribbon cassette 14 in the apparatus, it is necessary only to push in cassette 14 along its longitudinal direction (axial direction of platen 10) in a manner such that the open end face of slit 33c faces the end face of holder 12, causing holder 12 to engage slit 33c, as shown in FIGS. 13 and 14. Ribbon cassette 14 may be removed from the apparatus by being drawn out in the opposite direction.

Ribbon cassette 14 can be attached to or removed from holder 12 through a loading gate or opening 43 formed in the right side face of housing 1, as shown in FIGS. 2 and 3. Loading gate 43 is closed by a door member 44 as removal preventing means which can be opened only by specified operators. Thus, ribbon cassette 14 cannot be removed from the apparatus by any other persons than the specified operators. In other words, it is impossible for any outsiders to take out the used ribbon cassette 14 from the apparatus to read recorded information from remaining ink on ink portions 21a to 21d.

Ribbon cassette 14 is provided with a grip 45 (see FIG. 15) on one end face of case 33. Grip 45 greatly facilitates the loading and unloading of ribbon cassette 14.

At least both end portions of case 33 of ribbon cassette 14 are formed of a transparent or translucent material. Thus, thermal transfer ribbon 15 can be externally checked for its size, color and roll size through case 33.

Figure 15:
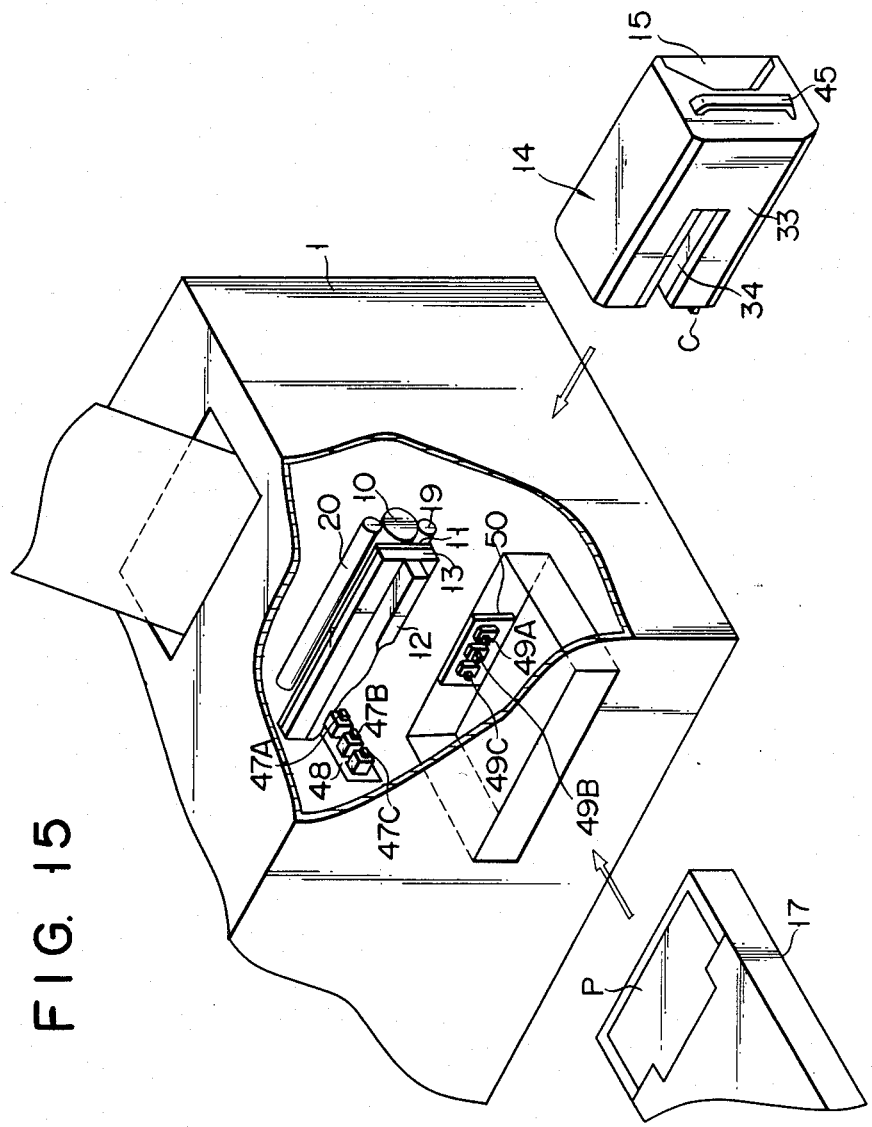
Figure 16:
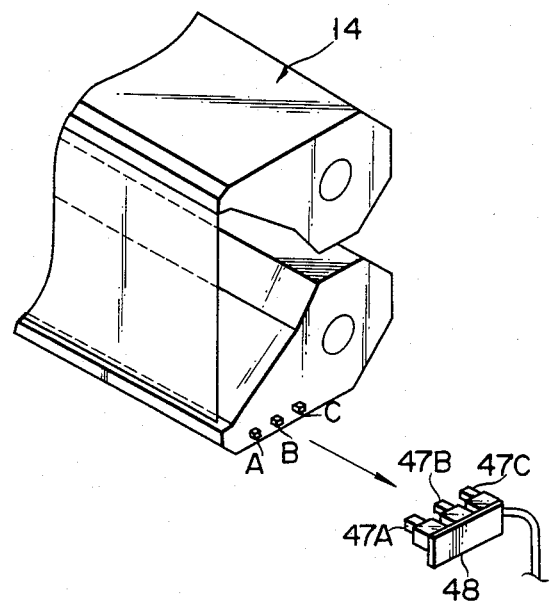
Figure 18:
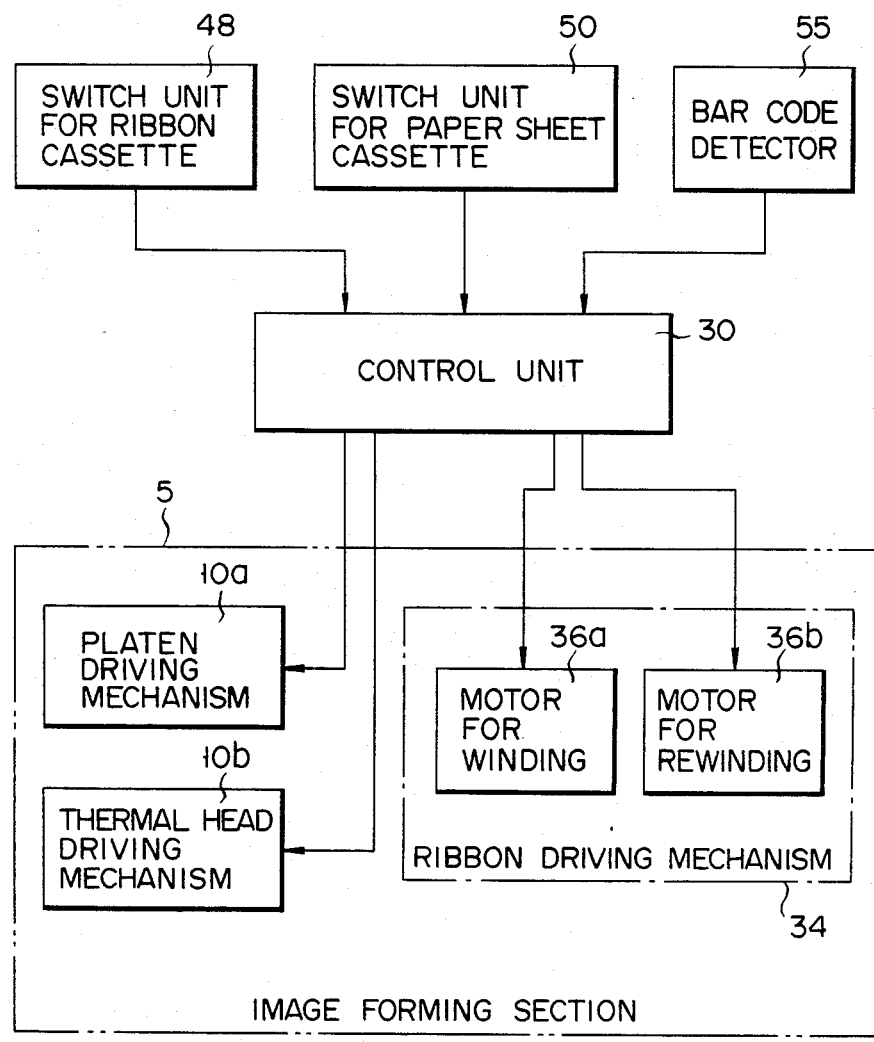

As shown in FIGS. 11 to 14, three projections A, B and C as information detection indicators for detecting the type of ribbon cassette 14 selectively protrude from one end face or driving force receiving end portion side of case 33 of ribbon cassette 14. As shown in FIGS. 15 and 16, a switch unit 48 with three switches 47A, 47B and 47C is disposed inside housing 1. Switches 47A, 47B and 47C are selectively activated when they are pressed by the projections A, B and C, respectively. Switch unit 48 is connected to control unit 30, as shown in FIG. 18.

When ribbon cassette 14 is set in housing 1, selected ones of switches 47A, 47B and 47C are pushed corresponding to projections A, B and C on case 33, indicating the type of cassette 14. Control unit 30 detects the on-off combinations (binary-coded) of switches 47A, 47B and 47C. In accordance with the result of this detection, the presence and type (size, color, etc.) of ribbon cassette 14 are identified.

Projections A, B and C can be associated in eight ($=2^3$) combinations. One of these combinations, e.g., absent-absent-absent, is used for detecting the presence of ribbon cassette 14, while the other seven combinations are used for discriminating the size, color and other details of thermal transfer ribbon 15.

Figure 17:
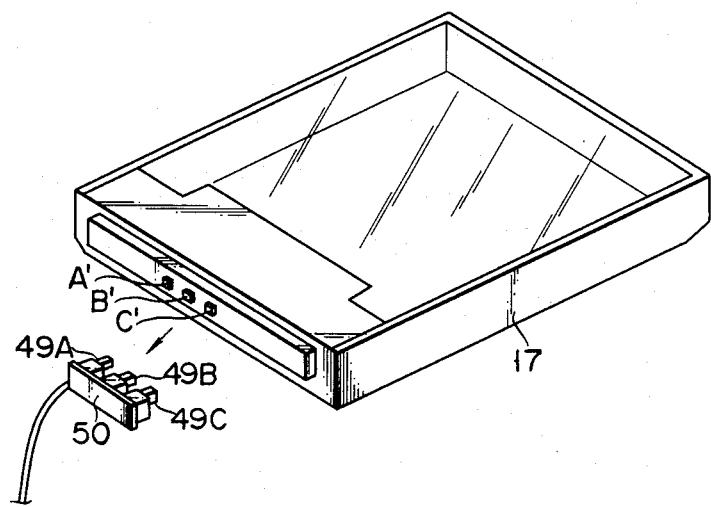

As shown in FIG. 17, three projections A, B and C as indicators for information detection, like those of ribbon cassette 14, selectively protrude from the front end face of sheet cassette 17. As shown in FIGS. 15 and 17, a switch unit 50 with three switches 49A, 49B and 49C is disposed inside housing 1. Switches 49A, 49B and 49C are selectively activated when they are pressed by projections A, B and C, respectively. Switch unit 50 is connected to control unit 30, as shown in FIG. 18.

When sheet cassette 17 is set in housing 1, selected ones of switches 49A, 49B and 49C are pushed corresponding to projections A, B and C on sheet cassette 14 indicating the type of sheets in cassette 14. Control unit 30 detects the on-off combinations of switches 49A, 49B and 49C. In accordance with the result of this detection, the type (sheet size, sheet type, etc.) of sheet cassette 17 is identified.

The respective output signals of switch units 48 and 50 for the ribbon cassette and the sheet cassette are fed to control unit 30, as shown in FIG. 18. Control unit 30 may include a microcomputer for controlling platen driving mechanism 10a, thermal head driving mechanism 10b and ribbon driving mechanism 34. In control unit 30, the detected sizes of the coloring agent regions of ink portions 21a to 21d of thermal transfer ribbon 15 and sheets P are compared.

If control unit 30, based on the output signals from switch units 48 and 50, concludes that the size of each of coloring agent regions 21a to 21d of thermal transfer ribbon 15 is equal to that of sheets P, or that length X1 (see FIG. 19) of each of transfer regions 21a', 21b', 21c' and 21d' of sheet P is greater than half of length X of each coloring agent region of thermal transfer ribbon 15 is along the traveling direction thereof ($X/2 < X1 < X$), image forming section 5 is operated by control unit 30 in a normal first image forming mode in which thermal transfer ribbon 15 is not repeatedly used. However, if control unit 30 concludes that length X1 of each transfer region of sheets P is smaller than half length X of each coloring agent region of thermal transfer ribbon 15 along the traveling direction thereof ($X1 < X/2$), so that transfer ribbon 15 may be used twice or more, then control unit 30 controls image forming section 5 so that image forming section 5 is switched from operating in the normal first image forming mode to operating in a second image forming mode in which each of coloring agent regions 21a to 21d is used by halves.

Figure 19:
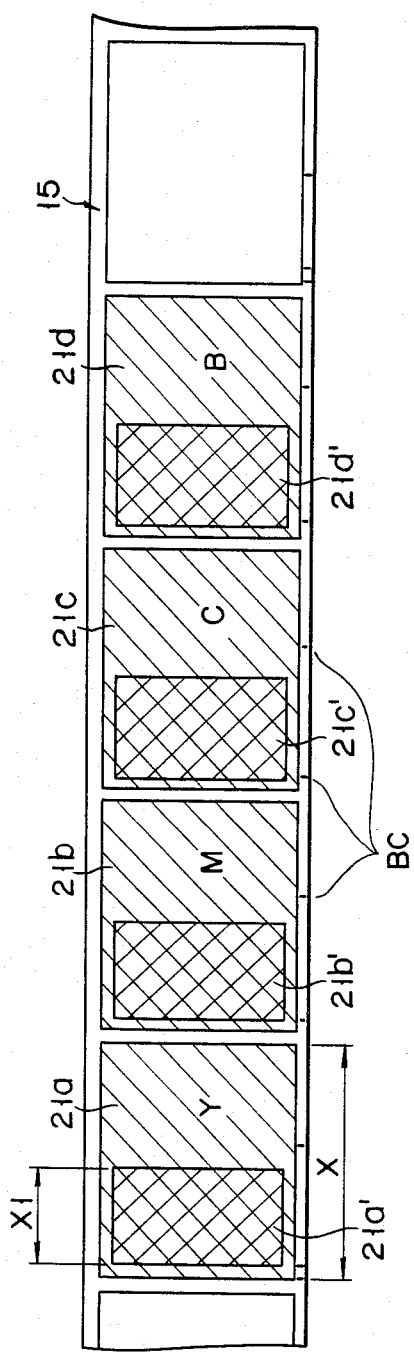

In forming an image on a sheet P of e.g. size A5, in the second image forming mode, a first cycle of transfer is started in which the forward half of each of coloring agent regions 21a to 21d defines each of the transfer regions (cross-hatched portions), as shown in FIG. 19. Sheet P is fed as platen 10 is rotated by platen driving mechanism 10a, while thermal transfer ribbon 15 is run as roll shaft 31 is rotated by winding-side motor 36a of ribbon driving mechanism 34. Thus, a prescribed multi-color image is formed on sheet P.

Figure 20:
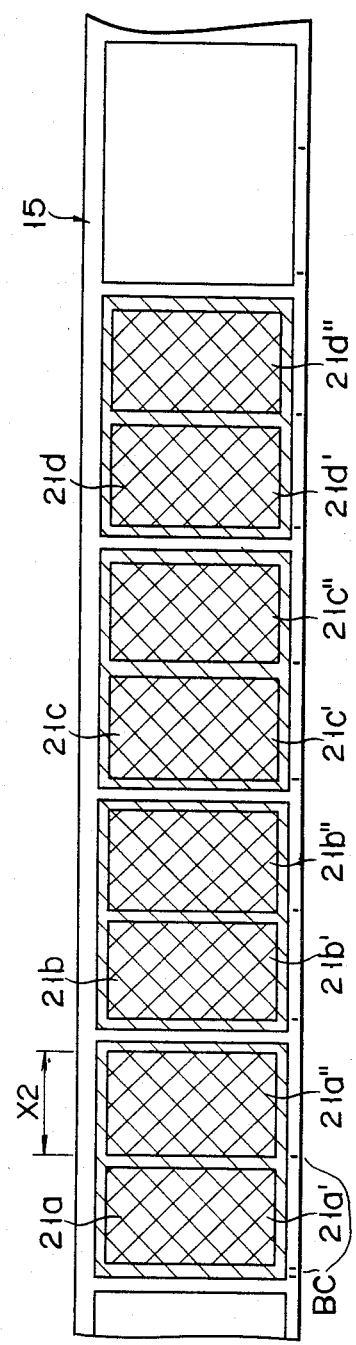

In a second cycle of image transfer for forming another image on another sheet P of size A5, thermal transfer ribbon 15 is returned as roll shaft 32 is rotated by rewinding-side motor 36b of ribbon driving mechanism 34, then the unused portion of the yellow (Ye) coloring agent region 21a of thermal transfer ribbon 15, i.e., a remaining rear half 21a'' of coloring agent region 21a, as shown in FIG. 20, faces the next sheet P of size A5. Thereafter, magenta (Ma), cyan (Cy) and black (Bl) colors are transferred to the sheet P by using the respective rear halves 21b'', 21c'' and 21d'' of coloring agent regions 21b, 21c and 21d.

As shown in FIGS. 19 and 20, bar codes BC are arranged along one side margin of thermal transfer ribbon 15, corresponding to forward halves 21a', 21b', 21c' and 21d' and rear halves 21a'', 21b'', 21c'' and 21d'' of coloring agent regions 21a, 21b, 21c and 21d, whereby thermal transfer ribbon 15 is stopped so that each of halves 21a', 21b', 21c', 21d', 21a'', 21b'', 21c'' and 21d'' is superposed on sheet P of size A5. A bar code detector 55 (see FIG. 4) for reading bar codes DC to stop the drive of ribbon driving mechanism 34 is provided in image forming section 5. By the use of bar codes BC and detector 55, thermal transfer ribbon 15 is accurately stopped at specified positions.

Referring now to the flow charts of FIGS. 27A to 27G, the operation of the image forming apparatus, especially of control unit 30, will be described.

When sheet cassette 17 and ribbon cassette 14 are both set in housing 1, the image forming apparatus starts and step S1 is performed. In step S1, the number of colors of thermal transfer ribbon 15 is determined on the basis of the on-off states of switches 47A, 47B and 47C in switch unit 48 for ribbon cassette 14, responsive to the positions of projections A, B and C of ribbon cassette 14. If one color is detected, step S2 is reached, setting $n=1$ and $m=0$. Symbols n and m indicate the number of colors and the number of bar codes which must be counted while ribbon 15 is being returned in the second image forming mode, respectively. If three colors are detected in step S1, step S3 is reached, setting $n=3$ and $m=5$. If four colors are detected in step S1, step S4 is reached, setting $n=4$ and $m=7$.

After values n and m are set in step S2, S3 or S4, step S5 is entered. In step S5, the size of sheet P detected on the basis of the on-off states of switches 49A, 49B and 49C in switch unit 50 for paper sheet cassette 17 responsive to the positions of projections A', B' and C' of sheet cassette 17 is compared with the size of each of ink portions 21a to 21d of ribbon 15 detected on the basis of the on-off states of switches 47A, 47B and 47C responsive to the positions of projections A, B and C of ribbon cassette 14. Thus, in step S5, whether the sheet size is smaller than half the size of each ink portion is determined. If the result of the determination in step S5 is positive, $F=1$ is set in step S6; if negative, $F=0$ is set in step S7. Here $F=1$ implies that a repetition flag is raised, while $F=0$ indicates the absence of the repetition flag.

If the flag is raised or lowered in step S6 or S7, step S8 is reached. In step S8, the number A of copies manually set is read. Then, in step S9, $B=0$ and $C=0$ are set as initial values. Thereafter, in step S10 (see FIG. 27B), whether the print is unicolored ($n=1$) or multicolored ($n>1$) is determined. If $n>1$, step S11 is entered; if $n=1$, then step S16 is entered.

In step S11, thermal head 11 is pressed against platen 10. Subsequently, in step S12, winding-side motor 36a rotates more powerfully than rewinding-side motor 36b to wind up thermal transfer ribbon 15 under a back tension, and platen 10 is rotated clockwise. Then, in step S13, bar code sensor 55 detects first color ink portion 21a of the thermal transfer ribbon 15. When the ink portion 21a is detected, step S14 is reached. In step S14, the drive of platen 10 is stopped. Subsequently, in step S15, thermal head 11 is released from platen 10, and motors 36a and 36b are stopped. In this state, the image forming apparatus is on stand-by.

When the copying button is depressed, as sensed in step S16, the stand-by state is released, and step S17 is entered. In step S17, sheet P is supplied, and ribbon driving motors 36a and 36b rotate in opposite directions with equal force. In this state, therefore, the ribbon 15 does not travel although motors 36a and 36b rotate. Subsequently, in step S18, thermal head 11 is pressed against platen 10, so that thermal transfer ribbon 15 and the sheet P are held between members 11 and 10. Thereafter, in step S19 (see FIG. 27C), whether the print is unicolored ($n=1$) or multicolored ($n>1$) is determined. If the print is unicolored ($n=1$), step S20 is entered; if multicolored ($n>1$), then step S25 is entered.

In step S20, platen 10 is rotated clockwise, and winding-side motor 36a rotates more powerfully than rewinding-side motor 36b to wind up ribbon 15. At the same time, sheet P is printed and then discharged. Thereafter, in step S21, 1 is added to B. Then, in step S22, the drive of platen 10 is stopped, and the driving forces of motors 36a and 36b are balanced to stop the travel of ribbon 15. In step S23, thermal head 11 is released from platen 10. Thereafter, in step S24, whether a predetermined number of copies have been made is determined. If the preset number A of copies have been made ($A=B$), the operation is ended. If the result of the determination is negative ($A \neq B$), step S17 is resumed (in FIG. 27B), and the aforesaid operation is repeated. If $A=1$ is preset, for example, $A=B=1$ is obtained in step S24 for a first cycle, and the operation is ended. if $A=2$ is preset, however, $A=2$ and $B=1$ are obtained in step S24 for the first cycle, and step S17 is resumed. One (1) is added to the value B to set $B=2$ in step S21 for a second cycle. In step S24 for the second cycle, therefore, $A=B=2$ is detected, and the operation is ended.

If the print is multicolored ($n>1$), the repetition flag F is checked in step S25. If the repetition flag F is raised ($F=1$), step S26 is reached. If the flag F is not raised ($F=0$), step S46 is entered (in FIG. 27D).

Figure 27A:
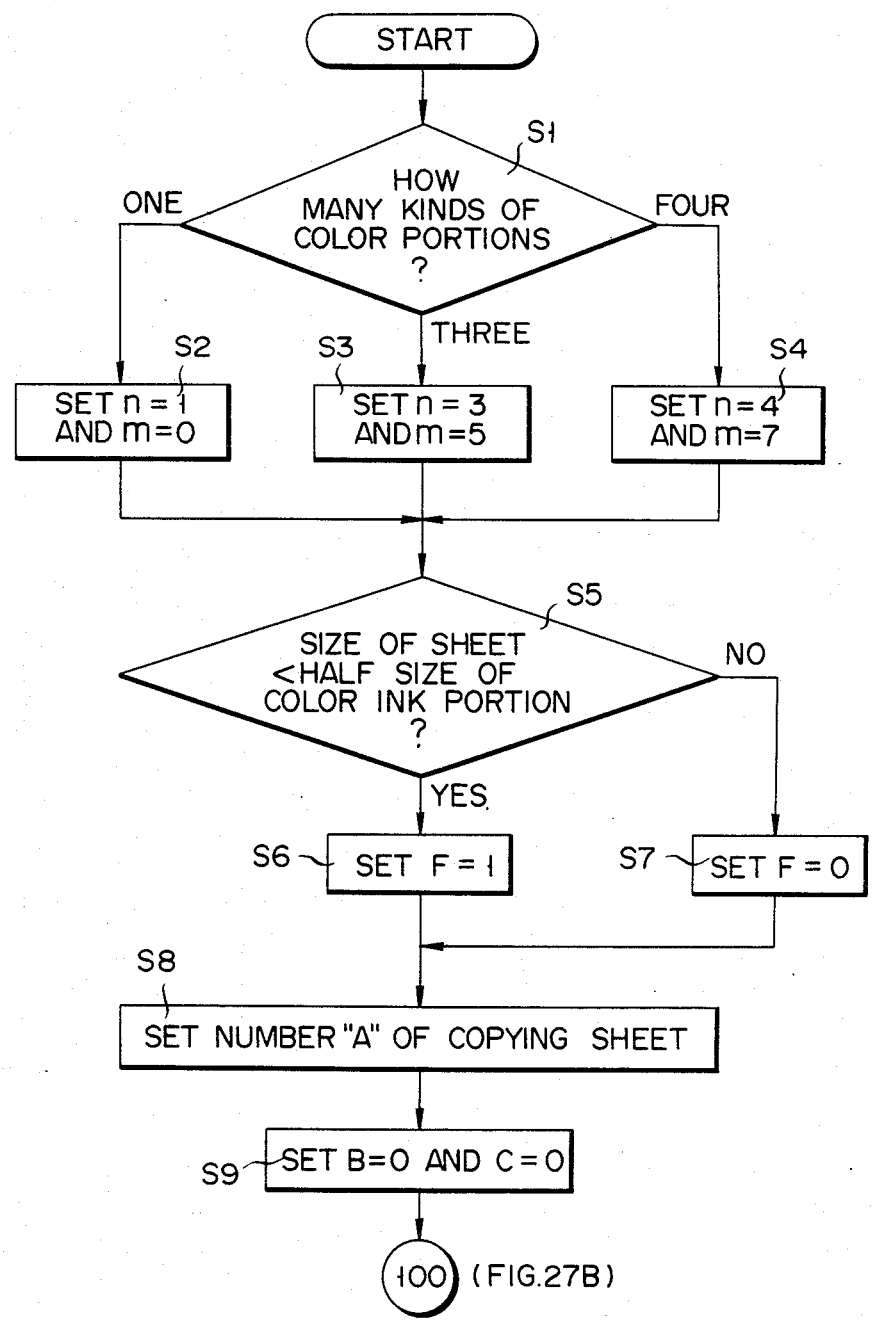
FIGS. 27A to 27G are flow charts explaining the operation of the image forming apparatus.
Figure 27B:
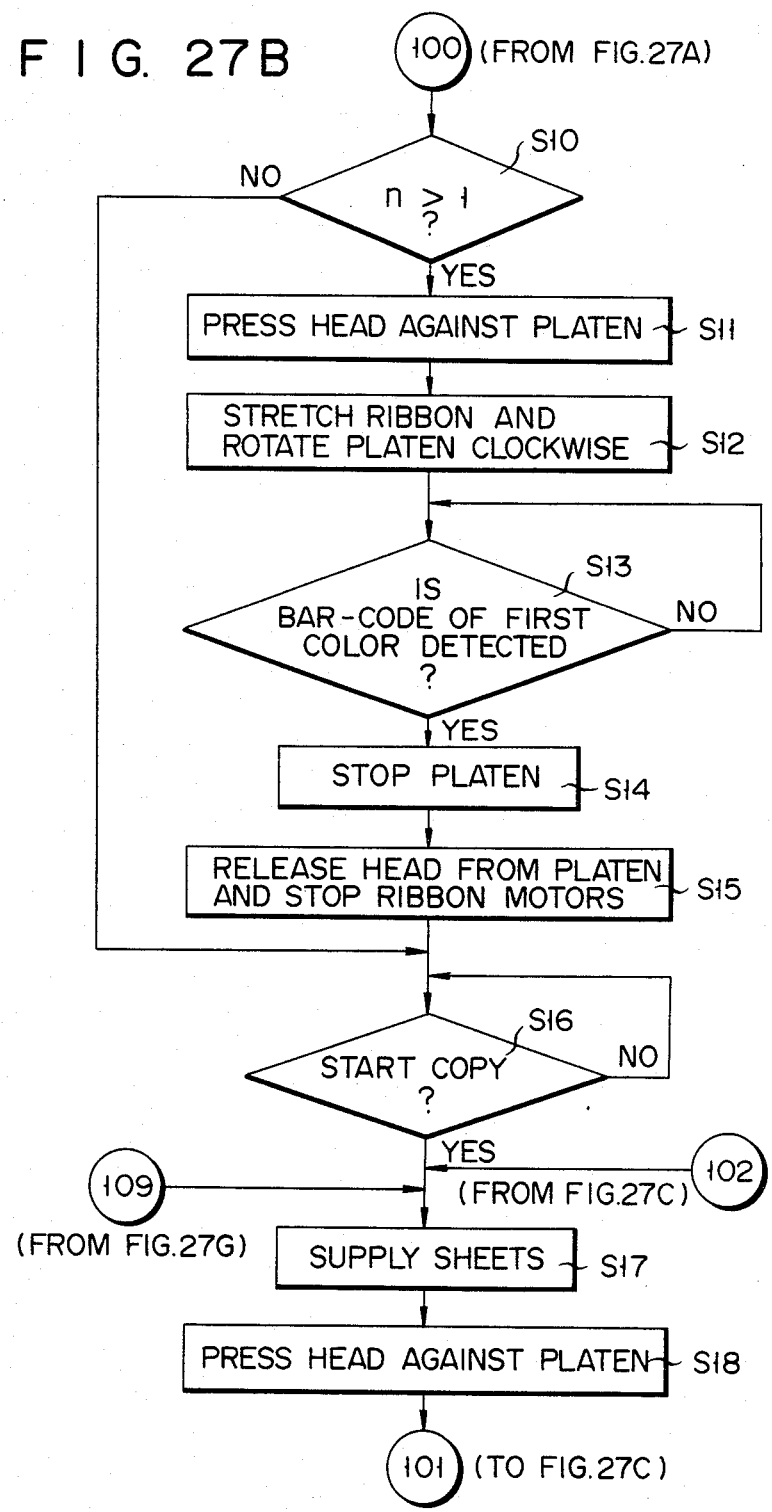
Figure 27C:
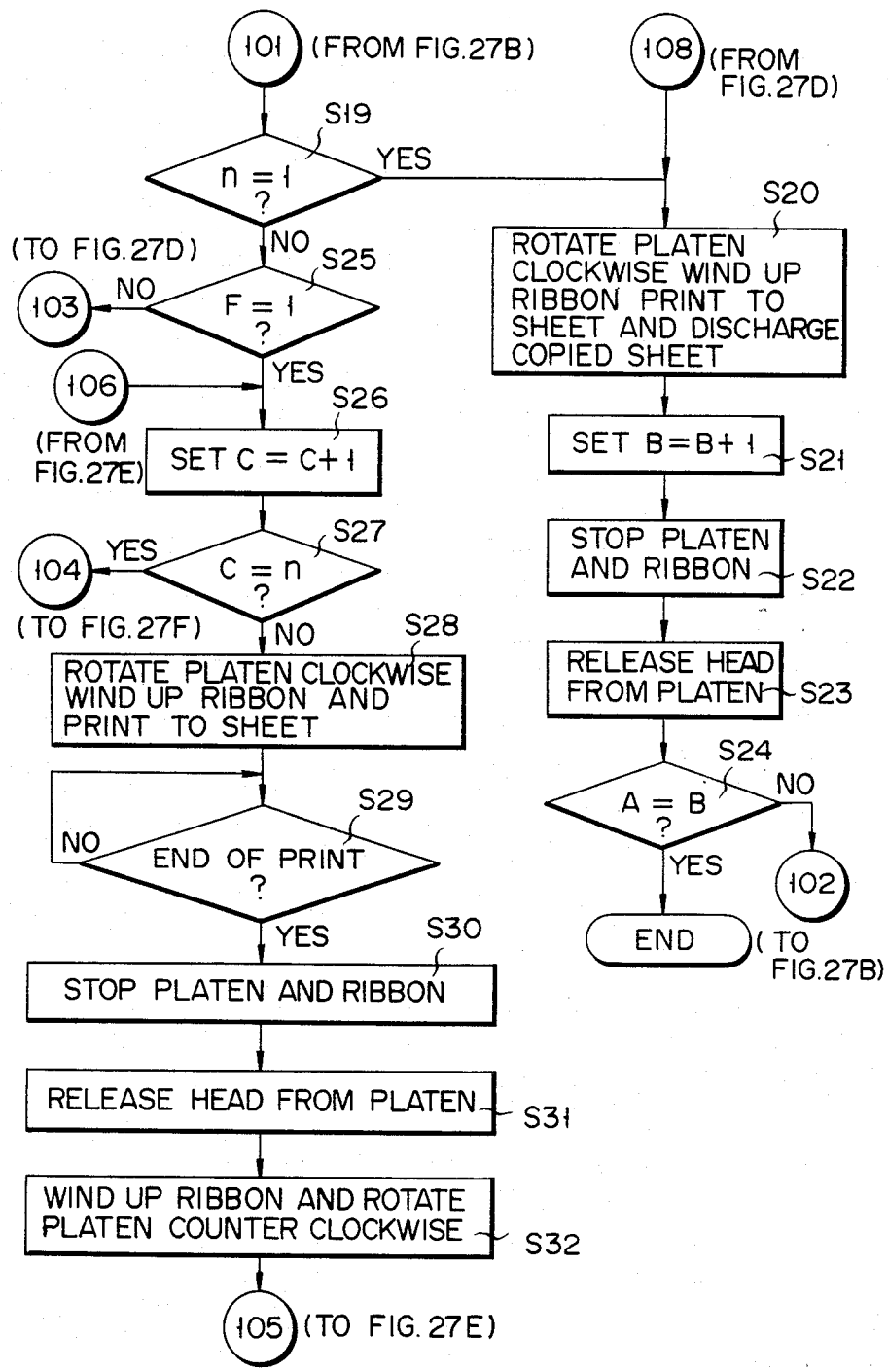
Figure 27D:
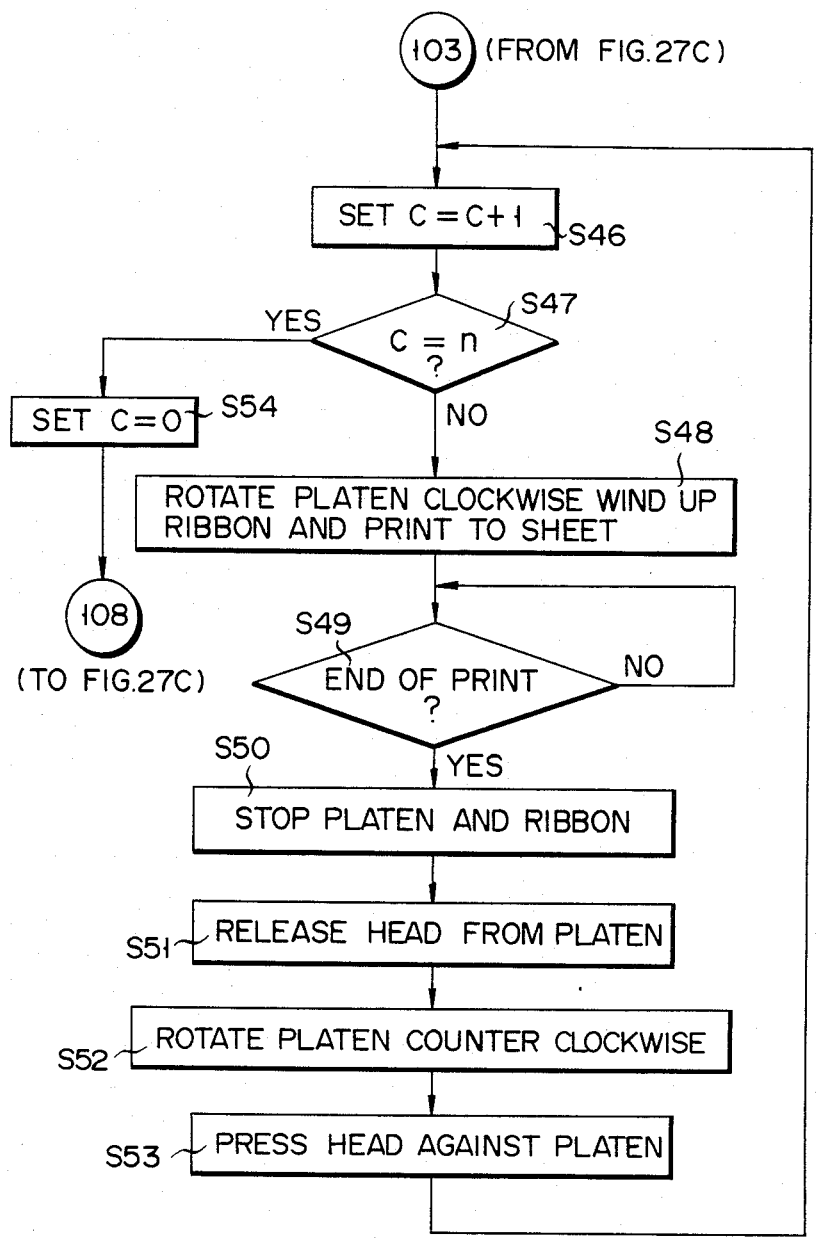
Figure 27E:
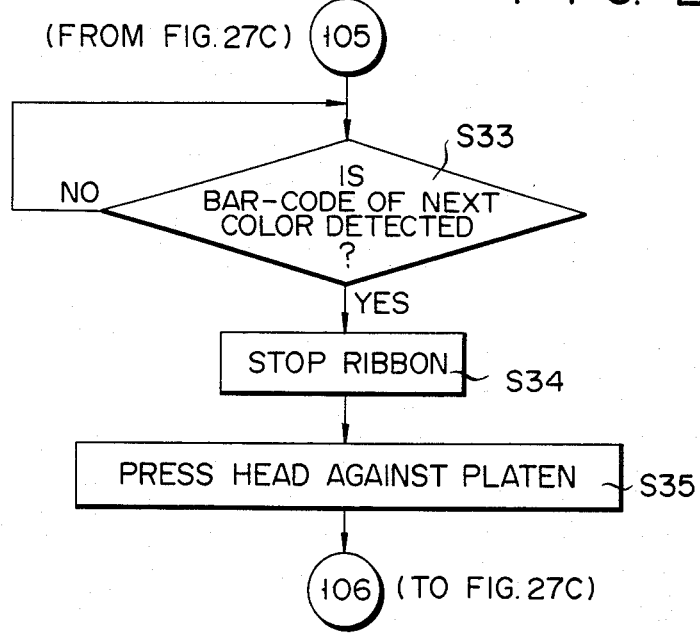
Figure 27F:
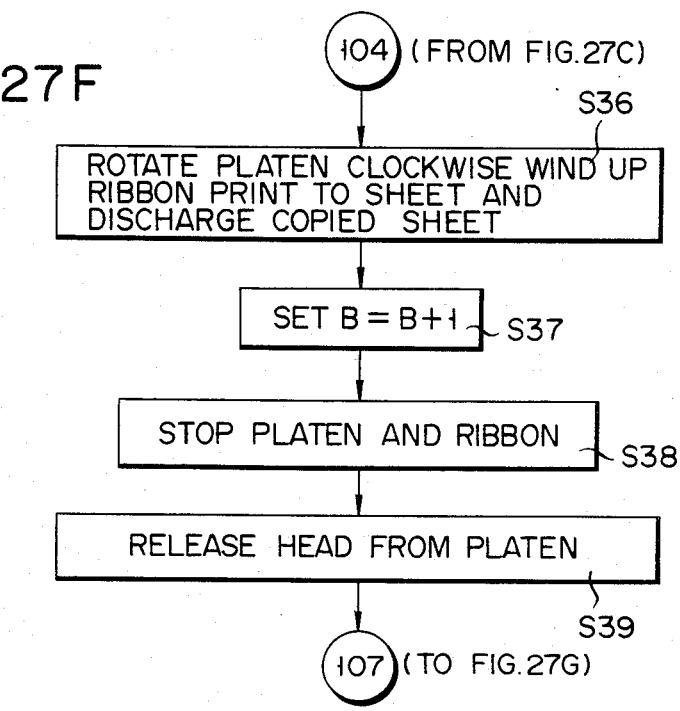
Figure 27G:
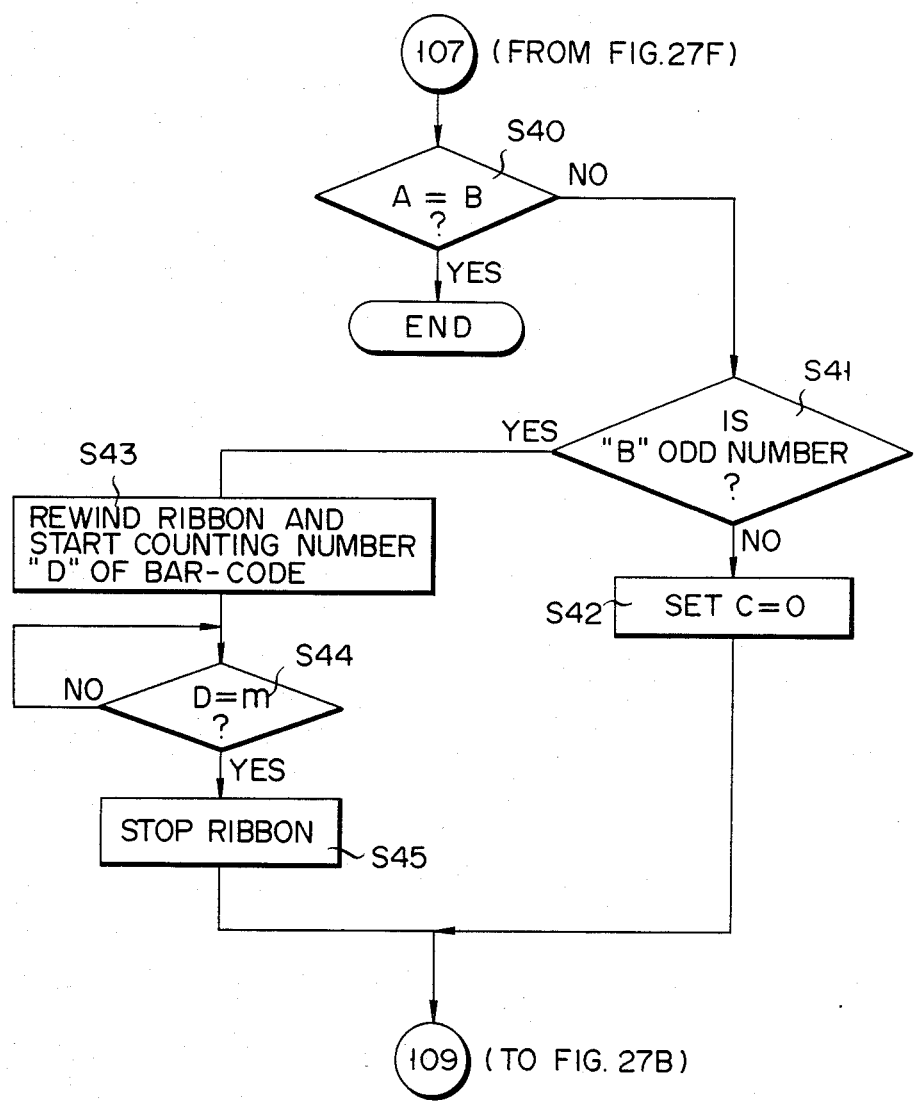

In step S26, 1 is added to the value C which has previously been set to zero in step S8 (FIG. 27A). Subsequently, in step S27, the number of print colors is determined. If printing of the last color ($n=C$) is detected in step S27, step S36 is reached (FIG. 27F). If $n>C$, then step S28 is entered. In step S28, platen 10 is rotated clockwise, and winding-side motor 36a rotates more powerfully than rewinding-side motor 36b to wind up ribbon 15. At the same time, printing on sheet P is started. As soon as the end of the printing operation is detected in step S29, step S30 is entered. In step S30, the drive of platen 10 is stopped, and the driving forces of ribbon driving motors 36a and 36b are balanced to stop the travel of ribbon 15. Subsequently, in step S31, thermal head 11 is released from platen 10. Thereafter, in step 32, ribbon driving motors 36a and 36b rotate again so as to wind up ribbon 15, and platen 10 is rotated counterclockwise to return sheet P to its initial position (print start position).

Subsequently, in step S33 (in FIG. 27E), a bar code representing the position of the leading end of an ink portion for the next print is detected by bar code sensor 55. When the bar code is detected, the feed of ribbon 15 is stopped in step S34. In step S35, thermal head 11 is pressed against platen 10, so that sheet P and that part of thermal transfer ribbon 15 which includes the next ink portion are held between members 11 and 10. Thereafter, step S26 is entered (in FIG. 27C).

If the printing of the last color (n=C) is detected in step S27, platen 10 is rotated clockwise, ribbon 15 is wound up, and the last printing cycle is executed in step S36 (in FIG. 27F). When the printing operation is ended, sheet P is discharged. Subsequently, the value B is incremented in step S37, and the drive of platen 10 and the feed of ribbon 15 are stopped in step S38. Then, in step S39, thermal head 11 is released from platen 10. Thereafter, in step S40 (in FIG. 27G), whether the predetermined number of copies have been made is determined. If the result of the determination is positive (A=B), the copying operation is ended. If the result is negative (A≠B), step S41 is reached.

In step S41, whether the value B is an odd number (indicating that the second half of each ink portion 21 may still be used) or not (indicating that both halves of each ink portion 21 have been used) is determined. If the B is an odd number, step S43 is reached; if an even number, then step S42. In step S42, the value C is reset to zero, and step S17 is performed (see FIG. 27B). In step S43, rewinding-side motor 36b rotates more powerfully than winding-side motor 36a to rewind ribbon 15, and the number D of the bar codes reached is reckoned by bar code sensor 55. Then, in step S44, whether the preset count number m is reached by the detected value D is detected. When D=m is obtained (indicating rewinding back to the second half of the first ink portion 21a''), step S45 is entered. In step S45, the driving forces of motors 36a and 36b are balanced to stop the travel of ribbon 15. Thereafter, step S17 is reached (see FIG. 27B).

If the absence of flag F (F=0) is detected in step S25 (in FIG. 27C), 1 is added to the value C in step S46. Subsequently, in step S47, the number of printed colors is detected, that is, whether printing has been effected for the preset number n of colors of ribbon 15 is determined. If it is concluded that the color to be printed next is not the last color (C≠n), step S48 is entered. If the color for the next printing cycle is the last color (C=n), step S54 is entered. In step S54, the value C is reset to zero, when step S20 (FIG. 27C) is reached.

In step S48 (FIG. 27D), platen 10 is rotated clockwise, and winding-side motor 36a rotates more powerfully than rewinding-side motor 36b to wind up ribbon 15. At the same time, printing on sheet P is executed. Subsequently, in step S49, whether the printing operation is ended is determined. When the end of the printing operation is detected, step S50 is entered. In step S50, the drive of platen 10 is stopped, and the driving forces of motors 36a and 36b are balanced to stop the travel of ribbon 15. Then, in step S51, thermal head 11 is released from platen 10. Thereafter, in step S52, platen 10 is rotated counterclockwise to return sheet P to its initial position (print start position). Subsequently, in step S53, thermal head 11 is pressed against platen 10, so that ribbon 15 and sheet P are held between members 11 and 10. Thereafter, step S46 is reached.

Accordingly, in forming an image on a sheet P of size A5 or in forming an image corresponding to size A5 by using thermal transfer ribbon 15 of size A4, for example, the loss of ribbon 15 is eliminated, and the processing capacity of ribbon cassette 14 is doubled.

The present invention is not limited to the embodiment described above. In the above embodiment, projections A, B and C are integrally formed on case 33 of ribbon cassette 14 to constitute the indicators for information detection which are detected by the coloring agent region detecting means for detecting the size of the coloring agent regions of the transfer material. However, the number of the projections is not limited to three, and any number of projections may be used. Instead of integrally forming projections A, B and C on case 33, three projections D each having a slit 53 and hooks 54 may be selectively inserted in socket holes 52A, 52B and 52C formed in case 33, as shown as a first modification in FIGS. 21 and 22.

Figure 21:
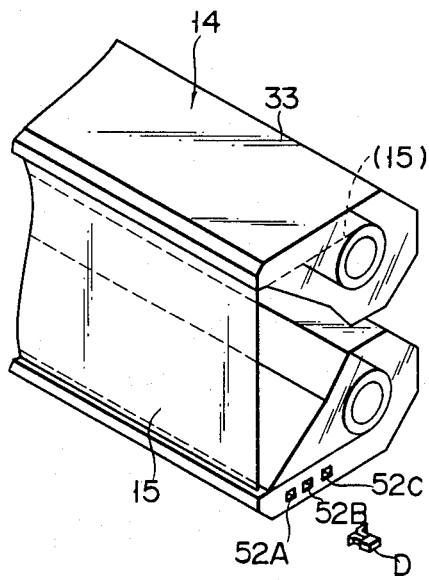
Figure 22:
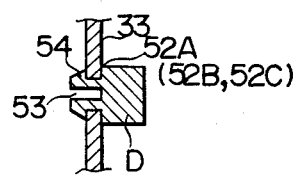
Figure 23:
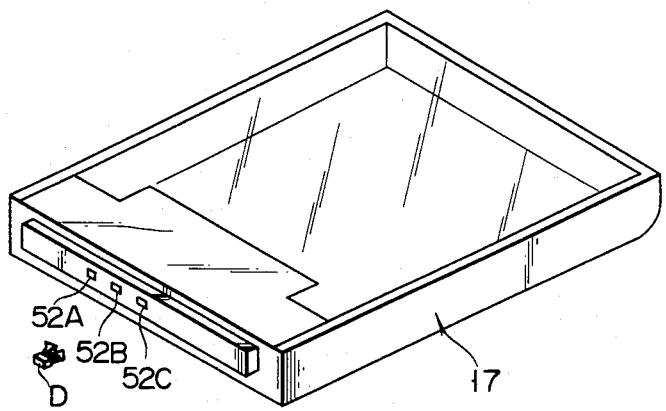
Figure 24:
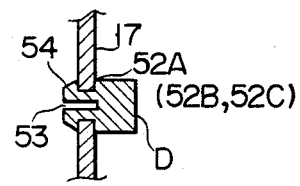

As shown as a second modification in FIGS. 23 and 24, the projections serving as the indicators for information detection, which are detected by the sheet size detecting means for detecting the size of sheet P, may also be removably attached to sheet cassette 17. In FIGS. 21 and 22, like reference numerals are used to designate like portions or components.

Figure 25:
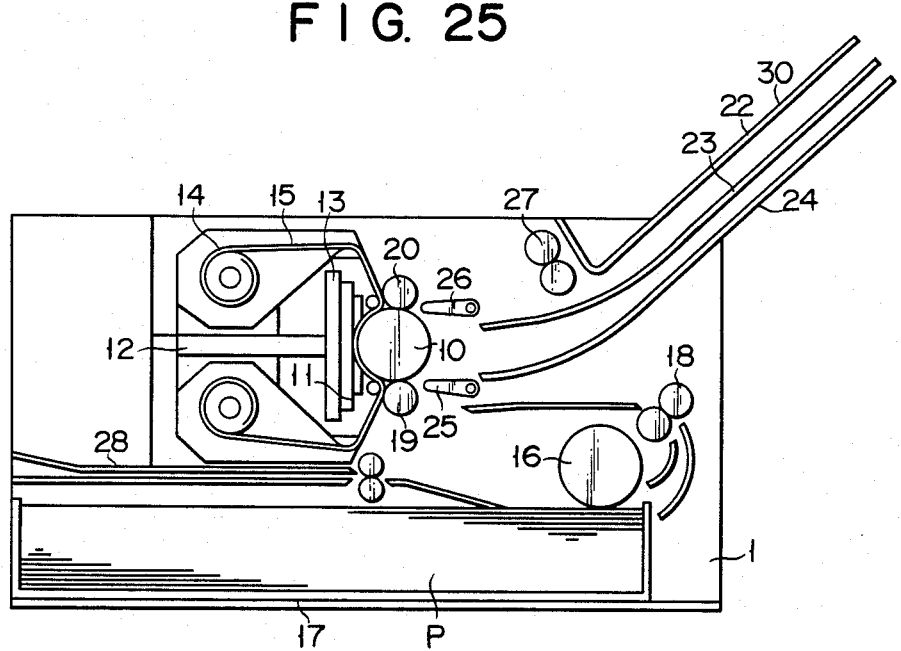
Figure 26:
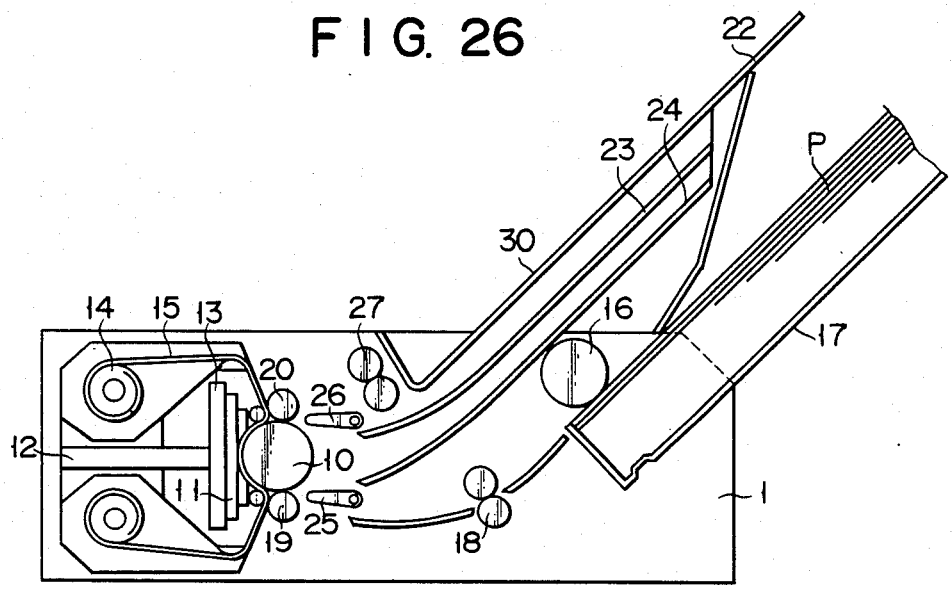

In the first embodiment, moreover, sheet cassette 17 is of a front loading type, partially projecting from the front wall of housing 1. Alternatively, however, sheet cassette 17 may be designed so as to be entirely encased in housing 1, as shown as a third modification in FIG. 25, or may be of a top loading type, as shown as a fourth modification in FIG. 26. The sheet supply system need not always use the cassette. Thus, the present invention can be applied to any image forming apparatus which can transfer coloring agents of a transfer material to an object to form a desired image thereon.

It is to be understood that various changes and modifications can be effected in the present invention by one skilled in the art without departing from the scope or spirit of the invention.

What is claimed is:

1. Image forming apparatus for applying a multicolored image to an object with a transfer material including successive sections of a predetermined number of coloring agents of different colors, said apparatus comprising:
    first means for detecting the size of said sections and generating a first detection signal related thereto;
    second means for detecting the size of said object and generating a second detection signal related thereto;
    discriminating means for determining whether a dimension of said object, as indicated by said second detection signal, is greater than half of a dimension of said sections, as indicated by said first detection signal, and establishing a first image forming mode when said determination is positive and a second image forming mode when said determination is negative; and
    imaging means for: (1) transferring coloring agents from, said successive sections to said object to form an image in response to said first image forming mode, and (2) transferring coloring agents from a first portion of each of said successive sections to one said object to form a first image and then transferring coloring agents from a second portion of each of said successive sections to another said object to form a second image in response to said second image forming mode.

2. The image forming apparatus according to claim 1, wherein said coloring agents include yellow, magenta and cyan inks.

3. The image forming apparatus according to claim 2, wherein said coloring agents further include black ink.

4. The image forming apparatus according to claim 1, wherein each said coloring agent is formed of heat-fusible ink, and said imaging means includes a thermal head.

5. An image forming apparatus which is loaded with a transfer material formed of a base extending in one direction and a predetermined number of coloring agents of different colors applied to said base along said one direction, so that said coloring agents of said transfer material are successively transferred to an object to form a color image thereon, said apparatus comprising:
   transfer means for transferring those portions of said coloring agents which correspond to specified image portions to said object;
   first driving means for selectively moving said object in either direction parallel to said one direction;
   second driving means for moving said transfer material in said one direction;
   third driving means for moving said transfer material in the other direction opposite said one direction;
   first detecting means for detecting the size of regions coated with said coloring agents and delivering a first detection result;
   second detecting means for detecting the size of said object and delivering a second detection result;
   discriminating means for checking to see if the length of said object along said one direction is greater than half the length of each said coloring-agent-coated region along said one direction in accordance with said first and second detection results, said discriminating means also for establishing a first image forming mode to prohibit the repeated use of said coloring agents when said length of said object is found to be greater than half said length of said coloring-agent-coated regions, and for establishing a second image forming mode to allow the repeated use of said color agents when said length of said object is found to be not greater than half said length of said coloring agent-coated regions; and
   control means, responsive to said discriminating means and connected to said first, second and third driving means for controlling said first, second and third driving means to cause, in said second image forming mode: (1) a first said object and said transfer material to be moved in said one direction by said first and second driving means, respectively, so that said first object is superposed on one portion of each said coloring-agent-coated region of said transfer material on one side thereof with respect to said one direction, (2) said first object to be moved further in said one direction by said first driving means after the transfer and said transfer material, part of which has been used in the transfer to be returned in said other direction by said third driving means, and (3) a second said object and said transfer material to be moved in said one direction by said first and second driving means, respectively, so that said second object is superposed successively on a different portion of each said coloring-agent-coated region.

6. The image forming apparatus according to claim 5, wherein said coloring agents include yellow, magenta and cyan inks.

7. The image forming apparatus according to claim 6, wherein said coloring agents further include black ink.

8. The image forming apparatus according to claim 5, wherein each said coloring agent is formed of heat-fusible ink, and said transfer means included a thermal head.

9. The image forming apparatus according to claim 5, wherein said first driving means includes a platen rotatably supported in position and engaging said transfer material, and a platen driving mechanism for rotating said platen selectively in first and second directions, said transfer material being adapted to move in said one and other directions when said platen rotates in said first and second directions, respectively.

10. The image forming apparatus according to claim 9, wherein said first driving means further includes a transfer means driving mechanism adapted to urge said transfer means so that said transfer means presses said transfer material and said object against said platen when said platen rotates in said first direction, and to move said transfer means away from said platen when said platen rotates in said second direction.

11. The image forming apparatus according to claim 5, further comprising a first cassette containing said transfer material and adapted to be set in a predetermined position in said apparatus, said first cassette including a housing having an opening through which said transfer material is partially exposed, and winding and rewinding shafts rotatably arranged in said housing and fixedly fitted with the starting and terminal end portions, respectively, of said transfer material.

12. The image forming apparatus according to claim 11, wherein said second driving means includes a first coupling adapted to engage said winding shaft when said first cassette is set in said apparatus and a first motor for driving said first coupling so that said transfer material moves in said one direction, and said third driving means includes a second coupling adapted to engage said rewinding shaft when said first cassette is set in said apparatus and a second motor for driving said second coupling so that said transfer material moves in said other direction.

13. The image forming apparatus according to claim 11, wherein said first cassette is provided with first information means for indicating the size of said coloring-agent-coated regions of said transfer material contained therein, and said first detecting means reads the information of said first information means.

14. The image forming apparatus according to claim 13, wherein said first information means includes a plurality of projections, whereby the size of each said coloring-agent-coated region is indicated by a combination of the number and positions of said projections, and said first detecting means includes a plurality of switches to be selectively activated by said projections.

15. The image forming apparatus according to claim 14, wherein said projections are integrally attached to said first cassette.

16. The image forming apparatus according to claim 14, wherein said projections are removably attached to said first cassette.

17. The image forming apparatus according to claim 5, further comprising a second cassette removably containing said objects and set in position in said apparatus, and takeout means for delivering said objects in said second cassette one by one toward said transfer means.

18. The image forming apparatus according to claim 17, wherein said second cassette is provided with second information means for indicating the size of said objects contained therein, and said second detecting means reads the information of said second information means.

19. The image forming apparatus according to claim 18, wherein said second information means includes a plurality of projections, whereby the size of said object is indicated by a combination of the number and positions of said projections, and said second detecting means includes a plurality of switches to be selectively activated by said projections.

20. The image forming apparatus according to claim 19, wherein said projections are integrally attached to said second cassette.

21. The image forming apparatus according to claim 19, wherein said projections are removably attached to said second cassette.

* * * * *